US008483979B2

(12) United States Patent
Henry et al.

(10) Patent No.: US 8,483,979 B2
(45) Date of Patent: Jul. 9, 2013

(54) STARTUP AND OPERATIONAL TECHNIQUES FOR A DIGITAL FLOWMETER

(75) Inventors: Manus P. Henry, Oxford (GB); Mayela E. Zamora, Oxford (GB)

(73) Assignee: Invensys Systems, Inc., Foxboro, MA (US)

( * ) Notice: Subject to any disclaimer, the term of this patent is extended or adjusted under 35 U.S.C. 154(b) by 0 days.

(21) Appl. No.: 13/532,858

(22) Filed: Jun. 26, 2012

(65) Prior Publication Data

US 2013/0000418 A1 Jan. 3, 2013

Related U.S. Application Data

(63) Continuation of application No. 13/017,585, filed on Jan. 31, 2011, now Pat. No. 8,224,593, which is a continuation of application No. 12/367,203, filed on Feb. 6, 2009, now Pat. No. 7,904,256, which is a continuation of application No. 11/458,251, filed on Jul. 18, 2006, now Pat. No. 7,505,854, which is a continuation of application No. 11/168,568, filed on Jun. 29, 2005, now Pat. No. 7,146,280, which is a continuation of application No. 10/402,131, filed on Mar. 31, 2003, now Pat. No. 6,950,760, which is a continuation-in-part of application No. 10/400,922, filed on Mar. 28, 2003, now abandoned.

(60) Provisional application No. 60/368,153, filed on Mar. 29, 2002.

(51) Int. Cl.
*G06F 1/00* (2006.01)

(52) U.S. Cl.
USPC ............... 702/45; 73/861.356; 73/861.357

(58) Field of Classification Search
USPC ............... 702/45–47, 50, 54, 100, 104, 106, 702/137; 73/861.04, 861.12, 861.355, 861.356, 73/861.357
See application file for complete search history.

(56) References Cited

U.S. PATENT DOCUMENTS

| 3,956,682 A | 5/1976 | Van Dyck |
| RE29,383 E | 9/1977 | Gallatin et al. |

(Continued)

FOREIGN PATENT DOCUMENTS

| EP | 0702212 A2 | 3/1996 |
| WO | 0010059 A1 | 2/2000 |

OTHER PUBLICATIONS

DeCarlo, Joseph, "True Mass-Flow Measurement"; Fundamentals of Flow Measurement, Unit 11-2; pp. 208-220; 1984.

(Continued)

*Primary Examiner* — John H Le
(74) *Attorney, Agent, or Firm* — Edward S. Jarmolowicz

(57) ABSTRACT

Startup and operational techniques for a digital flowmeter are described. For example, during a startup operation of the flowmeter, the mode of operation might include a random sequence mode, in which filtered, random frequencies are applied as a drive signal to a flowtube associated with the digital flowmeter. Once the flowtube reaches a resonant mode of vibration, the digital flowmeter may transition to a positive feedback mode, in which a sensor signal representing a motion of the flowtube is fed back to the flowtube as a drive signal. In a digital synthesis mode of operation, the analyzed sensor signals are used to synthesize the drive signal. The digital flowmeter may revert to a previous mode to regain stable and desired oscillation of the flowtube, such as might be required during a recovery operation associated with a disturbance to an operation of the digital flowmeter.

3 Claims, 22 Drawing Sheets

U.S. PATENT DOCUMENTS

| | | |
|---|---|---|
| 4,187,721 A | 2/1980 | Smith |
| 4,358,822 A | 11/1982 | Sanchez |
| RE31,450 E | 11/1983 | Smith |
| 4,419,898 A | 12/1983 | Zanker et al. |
| 4,422,338 A | 12/1983 | Smith |
| 4,491,025 A | 1/1985 | Smith et al. |
| 4,688,418 A | 8/1987 | Cheung et al. |
| 4,727,746 A | 3/1988 | Mikasa et al. |
| 4,757,390 A | 7/1988 | Mehrgardt et al. |
| 4,773,257 A | 9/1988 | Aslesen et al. |
| 4,782,711 A | 11/1988 | Pratt |
| 4,801,897 A | 1/1989 | Flecken |
| 4,817,448 A | 4/1989 | Hargarten et al. |
| 4,823,614 A | 4/1989 | Dahlin |
| 4,852,395 A | 8/1989 | Kolpak |
| 4,852,409 A | 8/1989 | Herzl |
| 4,852,410 A | 8/1989 | Corwon et al. |
| 4,879,911 A | 11/1989 | Zolock |
| 4,891,991 A | 1/1990 | Mattar et al. |
| 4,895,030 A | 1/1990 | Bergamini et al. |
| 4,911,006 A | 3/1990 | Hargarten et al. |
| 4,911,020 A | 3/1990 | Thompson |
| 4,934,195 A | 6/1990 | Hussain |
| 4,934,196 A | 6/1990 | Romano |
| 4,996,871 A | 3/1991 | Romano |
| 5,027,662 A | 7/1991 | Titlow et al. |
| 5,029,482 A | 7/1991 | Liu et al. |
| 5,050,439 A | 9/1991 | Thompson |
| 5,052,231 A | 10/1991 | Christ et al. |
| 5,054,313 A | 10/1991 | Fitzgerald et al. |
| 5,054,326 A | 10/1991 | Mattar |
| 5,218,869 A | 6/1993 | Pummer |
| 5,228,327 A | 7/1993 | Bruck |
| 5,259,250 A | 11/1993 | Kolpak |
| 5,271,281 A | 12/1993 | Mattar et al. |
| 5,295,084 A | 3/1994 | Arunachalam et al. |
| 5,301,557 A | 4/1994 | Cage et al. |
| 5,321,991 A | 6/1994 | Kalotay |
| 5,343,764 A | 9/1994 | Mattar et al. |
| 5,347,874 A | 9/1994 | Kalotay et al. |
| 5,400,653 A | 3/1995 | Kalotay |
| 5,429,002 A | 7/1995 | Colman |
| 5,469,748 A | 11/1995 | Kalotay |
| 5,497,665 A | 3/1996 | Cage et al. |
| 5,497,666 A | 3/1996 | Patten et al. |
| 5,535,632 A | 7/1996 | Kolpak |
| 5,555,190 A | 9/1996 | Derby et al. |
| 5,570,300 A | 10/1996 | Henry et al. |
| 5,578,764 A | 11/1996 | Yokoi et al. |
| 5,594,180 A | 1/1997 | Carpenter et al. |
| 5,648,616 A | 7/1997 | Keel |
| 5,654,502 A | 8/1997 | Dutton |
| 5,687,100 A | 11/1997 | Buttler et al. |
| 5,732,193 A | 3/1998 | Aberson |
| 5,734,112 A | 3/1998 | Bose et al. |
| 5,774,378 A | 6/1998 | Yang |
| 5,804,741 A | 9/1998 | Freeman |
| 5,877,954 A | 3/1999 | Kimassauskas et al. |
| 5,905,206 A | 5/1999 | Herwig et al. |
| 5,926,096 A | 7/1999 | Mattar et al. |
| 5,969,264 A | 10/1999 | Rivkin |
| 6,073,495 A | 6/2000 | Stadler |
| 6,092,429 A | 7/2000 | Cunningham et al. |
| 6,185,470 B1 | 2/2001 | Pado et al. |
| 6,199,022 B1 | 3/2001 | Cunningham |
| 6,301,973 B1 | 10/2001 | Smith |
| 6,309,342 B1 | 10/2001 | Blazey et al. |
| 6,311,136 B1 | 10/2001 | Henry et al. |
| 6,318,156 B1 | 11/2001 | Dutton et al. |
| 6,318,186 B1 | 11/2001 | Smith et al. |
| 6,327,914 B1 | 12/2001 | Dutton |
| 6,378,354 B1 | 4/2002 | Sharp |
| 6,505,131 B1 | 1/2003 | Henrot |
| 6,505,519 B2 | 1/2003 | Henry et al. |
| 6,507,791 B2 | 1/2003 | Henry et al. |
| 6,551,251 B2 | 4/2003 | Zuckerwar et al. |
| 6,564,619 B2 | 5/2003 | Dutton et al. |
| 6,950,760 B2 | 9/2005 | Henry et al. |
| 7,505,854 B2 | 3/2009 | Henry et al. |
| 7,904,256 B2 | 3/2011 | Henry et al. |
| 2002/0033043 A1 | 3/2002 | Dutton et al. |
| 2002/0038186 A1 | 3/2002 | Henry et al. |
| 2002/0133307 A1 | 9/2002 | Maginnis |

OTHER PUBLICATIONS

Grumski, J.T., et al., "Performance of a Coriolis-type Mass Flow Meter in the Measurement of Two-phase (air-liquid) Mixtures", ASME Fluid Engineering Division Publication FED, vol. 17, pp. 75-84, 1984.

Henry, M.P., "Self-Validation Improves Coriolis Meter", Control Engineering, 42 (6), pp. 81-86 (1995).

Henry, M.P., et al., "A New Approach to Sensor Validation", Improved Analyser Performance, IMC, Mar. 17, 1992.

Henry, M.P., et al., "A Self-Validating Digital Coriolis Mass-flow Meter: An Overview", Control Engineering Practice 8 (2000), 487-506.

Henry, M.P., et al., "A Standard Interface for Self-Validating Sensors", Report No. QUEL 1884/91, University of Oxford, Department of Engineering Science, Sep. 1991.

Henry, M.P., et al., "Signal Processing, Data Handling and Communications: The Case for Measurement Validation", Mar. 1992.

Henry, M.P., et al., "The Implications of Digital Communications on Sensor Validation", Report No. QUEL 1912/92, University of Oxford, Department of Engineering Science, Apr. 1992.

Henry, M.P., et al., "The Self-Validating Sensor: Rationale Definitions and Examples", Control Engineering Practice, 1(4), pp. 585-610, 1993.

J. Hemp et al.; "On the Theory and Performance of Coriolis Mass Flowmeters"; Proceedings of the International Conference on Mass Flow Measurement Direct and Indirect; IBC Technical Services; 40 pages; London, Feb. 1989.

Luntta, E., et al., "Neural Network Approach to Ultrasonic Flow Measurements", Flow Measurement and Instrumentation, vol. 10, pp. 35-43, 1999.

Merriam-Webster's Collegiate Dictionary, Tenth Edition, 1998, p. 747.

Skea, A.F., "Effects of Gas Leaks in Oil Flow on Single-Phase Flowmeters", Flow Measurement and Instrumentation, vol. 10, pp. 146-150 (1999).

Sptizer, David A., "Mass Flowmeters", Industries Flow Measurement, Chapter 12, pp. 197-210, 1990.

Wood et al., "A Phase-Locked Loop for Driving Vibrating Tube Densimeters," Rev. Sci. Instrum., vol. 60, No. 3, Mar. 1989, pp. 493-494.

Office Action for corresponding Chinese Application No. 200780040273.7, mailed Nov. 22, 2010, with English-language translation, 14 pages.

Response to Office Action dated Aug. 2, 2012 for corresponding U.S. Appl. No. 12/852,008, filed Nov. 30, 2012, 4 pgs.

Final Office Action dated Dec. 14, 2012 for corresponding U.S. Appl. No. 12/852,008, 10 pgs.

Office action issued Aug. 2, 2012 in related U.S. Appl. No. 12/852,008, 13 pgs.

Henry, M.P., "Intelligent" Behaviour for Self-Validating Sensors, Advances in Measurement, May 1990, pp. 1-7.

Henry, M.P., "Sensor Validation and Fieldbus", IEEE Computing and Control Engineering Journal, 6 (6), 1995, pp. 263-269.

Liu, R.P., et al., "A Neural Network to Correct Mass Flow Errors Caused by Two Phase Flow in a Digital Coriolis Mass Flow Meter". Engineering Science Department, Oxford University, vol. 12, No. 1, Mar. 2001, pp. 53-63.

Reimann, J., "Developments in Two-Phase Mass Flow Rate Instrumentation", 1983, pp. 339-402.

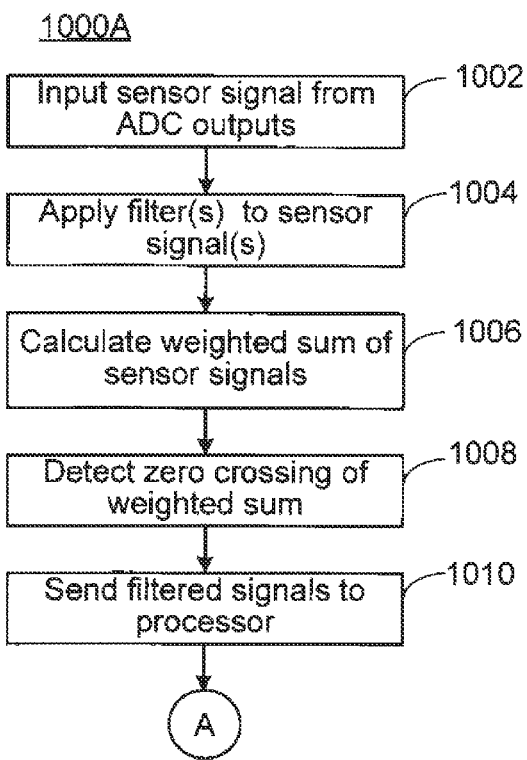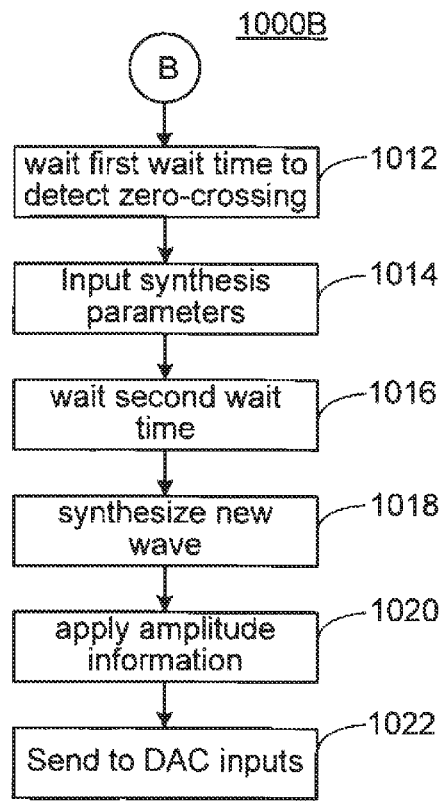
FIG. 10A
FIG. 10B

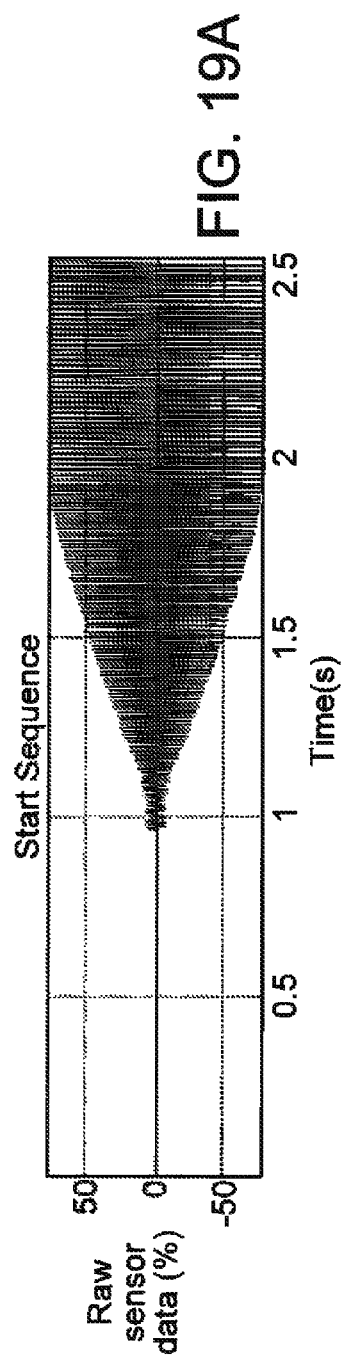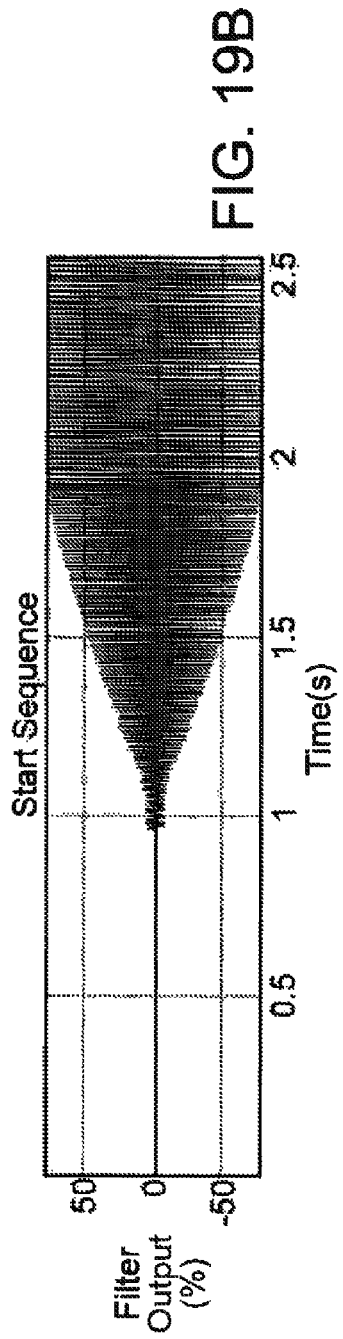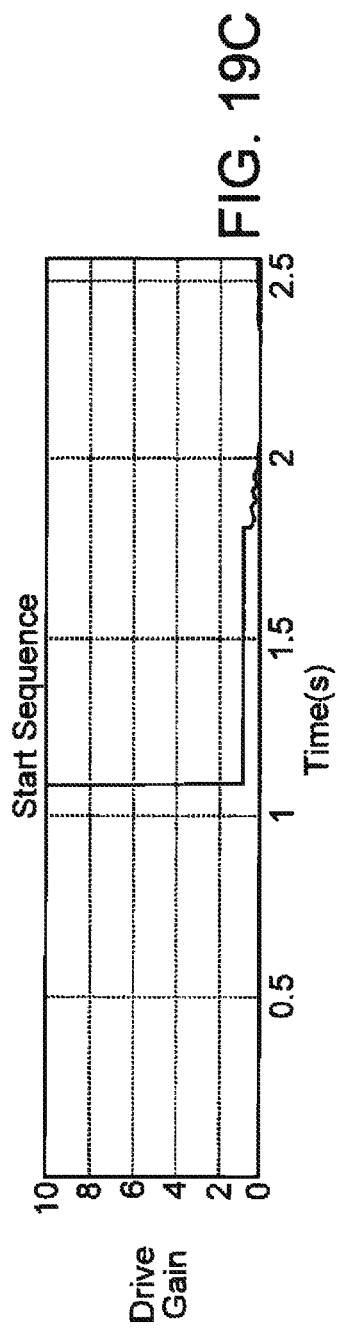

STARTUP AND OPERATIONAL TECHNIQUES FOR A DIGITAL FLOWMETER

CROSS REFERENCE TO RELATED APPLICATIONS

This application is a continuation of U.S. patent application Ser. No. 13/017,585, filed Jan. 31, 2011, title "STARTUP TECHNIQUES FOR A DIGITAL FLOWMETER", now allowed, which is a continuation of U.S. patent application Ser. No. 12/367,203, filed Feb. 6, 2009, titled "STARTUP TECHNIQUES FOR A DIGITAL FLOWMETER," now U.S. Pat. No. 7,904,256, which is a continuation of U.S. patent application Ser. No. 11/458,251, filed Jul. 18, 2006, titled "STARTUP TECHNIQUES FOR A DIGITAL FLOWMETER," now U.S. Pat. No. 7,505,854, which is a continuation of U.S. patent application Ser. No. 11/168,568, filed Jun. 29, 2005, titled "STARTUP AND OPERATIONAL TECHNIQUES FOR A DIGITAL FLOWMETER," now U.S. Pat. No. 7,146,280, which is a continuation of U.S. patent application Ser. No. 10/402,131, filed Mar. 31, 2003, titled "STARTUP AND OPERATIONAL TECHNIQUES FOR A DIGITAL FLOWMETER," now U.S. Pat. No. 6,950,760, which is a continuation-in-part of U.S. patent application Ser. No. 10/400,922, filed Mar. 28, 2003, and titled "DRIVE TECHNIQUES FOR A DIGITAL FLOWMETER," abandoned, which claims priority from U.S. Provisional Application No. 60/368,153, filed Mar. 29, 2002, and titled "ELLIPTICAL FILTER FOR DIGITAL FLOWMETER," all of which are incorporated by reference herein.

TECHNICAL FIELD

The invention relates to flowmeters.

BACKGROUND

Flowmeters provide information about materials being transferred through a conduit. For example, mass flowmeters provide a direct measurement of the mass of material being transferred through a conduit. Similarly; density flowmeters, or densitometers, provide a measurement of the density of material flowing through a conduit. Mass flowmeters also may provide a measurement of the density of the material.

Coriolis-type mass flowmeters are based on the Coriolis effect, in which material flowing through a rotating conduit becomes a radially travelling mass that is affected by a Coriolis force and therefore experiences an acceleration. Many Coriolis-type mass flowmeters induce a Coriolis force by sinusoidally oscillating a conduit about a pivot axis orthogonal to the length of the conduit. In such mass flowmeters, the Coriolis reaction force experienced by the traveling fluid mass is transferred to the conduit itself and is manifested as a deflection or offset of the conduit in the direction of the Coriolis force vector in the plane of rotation.

Energy is supplied to the conduit by a driving mechanism that applies a periodic force to oscillate the conduit. One type of driving mechanism is an electromechanical driver that imparts a force proportional to an applied current. In an oscillating flowmeter, the applied current is periodic, and is generally sinusoidal. The period of the input current may be chosen so that the motion of the conduit matches a resonant mode of vibration of the conduit, which generally reduces the energy needed to sustain oscillation. An oscillating flowmeter may use a feedback loop in which a sensor signal that carries instantaneous frequency and phase information related to oscillation of the conduit is amplified and fed back to the conduit using the electromechanical driver. Other types of driving mechanisms, such as an electromechanical driver that imparts a force proportional to an applied voltage, also may be used.

Many conventional flowmeters are essentially analog devices in which a sensor signal frequency and phase information are amplified, for example by an analog op-amp, before being fed back into the electromechanical driver. In such flowmeters, there may be little or no phase delay between the signal(s) being sensed at the conduit and the driving signal being applied to the conduit at the other end of the feedback loop. Such analog flowmeters may be prone to the introduction of high harmonics of a desired oscillation frequency, particularly during start-up operations when an estimated drive signal is applied to the conduit to begin the feedback loop described above. Moreover, analog flowmeters may be prone to gain saturation of the op amp, which may occur during "two-phase flow" through the conduit (e.g., an air pocket or entrained air in a flow of liquid) and which can lead to a damping effect on the conduit, or a stalling of the entire oscillation process. Finally, analog flowmeters may be prone to typical shortcomings of analog circuitry, e.g., relatively low precision and high noise measurements.

In contrast to analog flowmeters, digital flowmeters also exist. For example, U.S. Pat. No. 6,311,136 and U.S. Pat. No. 6,507,791, which are hereby incorporated by reference, disclose the use of a digital flowmeter and related technology. Such digital flowmeters may have various advantages over analog flowmeters for example, they may be more precise in their measurements, with less noise, and may be capable of enabling a wide range of positive and negative gains at the driver circuitry. Such digital flowmeters are thus advantageous in a variety of settings. For example, U.S. Pat. No. 6,505,519 discloses the use of a wide gain range, and/or the use of negative gain, to prevent stalling and to more accurately exercise control of the flowtube, even during difficult conditions such as two-phase flow.

SUMMARY

According to one general aspect, a digital flowmeter is operating in a random sequence mode, where the random sequence mode is characterized by a first drive signal that includes randomly-generated values and that causes a vibration of a flowtube. The digital flowmeter also is operated in a positive feedback mode, where the positive feedback mode is characterized by a sensor signal that corresponds to the vibration and that is used as a second drive signal for maintaining the vibration. The digital flowmeter also is operated in a digital synthesis mode, where the digital synthesis mode is characterized by a synthesis of a third drive signal for maintaining the vibration.

Implementations may include one or more of the following features. For example, the digital flowmeter may be transitioned between two or more of the random sequence mode, the positive feedback mode, and the digital synthesis mode.

In operating the digital flowmeter in the random sequence mode, the randomly-generated values may be filtered to remove frequency components above a pre-determined cut-off level, where the pre-determined cut-off level may be selected based on a range of potential resonance frequencies associated with the flowtube. Alternatively in operating the digital flowmeter in the random sequence mode, the randomly-generated values may be filtered to remove frequency components above a first pre-determined cut-off level and below a second pre-determined cut-off level.

The digital flowmeter also may be operated in a zero-output mode, the zero-output mode characterized by having a zero-value drive signal. In this case, operating the digital flowmeter in the random sequence mode may include detecting a pre-determined condition, and initiating operation of the zero-output mode, based on the predetermined condition.

In operating the digital flowmeter in the zero-output mode, the fact that a pre-determined amount of time has passed may be detected, and operation of the digital flowmeter may be transitioned into the positive feedback mode. Further, detecting the pre-determined condition may include detecting an end of a pre-determined time period.

In operating the digital flowmeter in the positive feedback mode, a first pre-determined condition may be detected, and operation of the digital synthesis mode may be initiated, based on the first pre-determined condition. In this case, in detecting the first pre-determined condition, a signal waveform may be detected within the sensor signal, it may be determined that the signal waveform has a pre-determined characteristic, such as sinewave characteristics, and operation of the digital flowmeter may be transitioned from the positive feedback mode into the digital synthesis mode.

Further, an instability associated with the operation of the digital flowmeter may be detected in the digital synthesis mode, and operation of the digital flowmeter may be transitioned from the digital synthesis mode into the positive feedback mode, in response to detecting the instability. Alternatively, an instability associated with the operation of the digital flowmeter in the digital synthesis mode may be detected, and operation of the digital flowmeter may be transitioned from the digital synthesis mode into the random sequence mode, in response to detecting the instability.

In operating the digital flowmeter in the positive feedback mode, a second predetermined condition may be detected, and operation of the flowmeter may be transitioned from the positive feedback mode into the random sequence mode, based on the second pre-determined condition. In this case, detecting the second predetermined condition may include detecting an instability in an operation of the flowmeter.

In operating the digital flowmeter in the positive feedback mode, an initial sensor signal may filtered to obtain the sensor signal. The sensor signal may be a digital signal, and operating the digital flowmeter in the positive feedback mode may include converting an analog sensor signal into the sensor signal.

In operating the digital flowmeter in the positive feedback mode, the sensor signal may be buffered to obtain a buffered sensor signal, and values may be selected from the buffered sensor signal to use as the second drive signal so as to compensate for a delay associated with the second drive signal, where the delay is associated with a digital element associated with the flowmeter.

In operating the digital flowmeter in the digital synthesis mode, an initial sensor signal may be filtered to obtain the sensor signal. Also, the synthesis of the third drive signal may be based on an analysis of the sensor signal.

According to another general aspect, a digital flowmeter includes a vibratable flowtube, sensor connected to the flowtube and operable to sense information about a motion of the flowtube, a driver connected to the flowtube and operable to impart energy to the flowtube, a filter system, a random-value generator operable to generate random-frequency signals, and a control and measurement system operable to apply the filter system to the random-frequency signals and supply filtered, random-frequency signals to the driver for application to the flowtube of a first drive signal during a first mode, and further operable to transition the digital flowmeter into a second mode characterized by a second drive signal.

Implementations may include one or more of the following features. For example, the control and measurement system may be operable to transition the digital flowmeter from the second mode to the first mode, in response to detecting a system disturbance associated with the digital flowmeter.

The second mode may be a zero-output mode in which the second drive signal has a magnitude of substantially zero, and the control and measurement system may transition the digital flowmeter from the first mode to the second mode after a we-determined amount of time. In this case, the control and measurement system may be further operable to transition the digital flowmeter from the second mode into a third mode, the third mode being a positive feedback mode characterized by a third drive signal that includes components of a sensor signal detected by the sensor and fed back to the driver.

Further, the control and measurement system may be further operable to transition the digital flowmeter from the third mode back into the first mode, in response to detecting a system disturbance associated with the digital flowmeter. Also, the control and measurement system may be further operable to transition the digital flowmeter from the third mode into a fourth mode, the fourth mode being characterized by a drive signal that is synthesized by the control and measurement system based on an analysis of the sensor signal. In this case, the filter system may be operable to filter an initial sensor signal to obtain the sensor signal, which may be a digital signal.

The control and measurement system may initiate transition from the third mode to the fourth mode in response to a pre-determined event, which may include detection of sinewave components within the sensor signal.

The control and measurement system may be further operable to transition the digital flowmeter from the fourth mode to the third mode, upon detecting a system disturbance associated with the digital flowmeter. The control and measurement system may be further operable to transition the digital flowmeter from the fourth mode to the first mode, upon detecting a system disturbance associated with the digital flowmeter.

The second mode may be a positive feedback mode in which the second drive signal includes components of a sensor signal detected by the sensor and fed back to the driver. Also, the second mode may be a digital synthesis mode in which the second drive signal is synthesized based on an analysis of a sensor signal detected by the sensor. The filter system is operable to filter the random-frequency signals to include a pre-determined range of frequencies within the filtered, random-frequency signals.

According to another general aspect, a flowmeter may include a vibratable flowtube, a sensor connected to the flowtube and operable to sense information about a motion of the flowtube by way of a sensor signal, a driver connected to the flowtube and operable to impart energy to the flowtube by way of a drive signal, and a digital transmitter operable to select and implement, from among a plurality of operational modes, an operational mode determined to be best-suited for a current operational environment of the digital flowmeter.

Implementations may include one or more of the following features. For example, the plurality of operational modes may include a random-sequence mode to generate the drive signal, in which the digital transmitter generates random frequencies, filters the random frequencies to obtain filtered random frequencies and delivers the filtered random frequencies to the driver. In this case, the digital transmitter may filter the random frequencies to retain frequencies within a pre-determined frequency range. The random-sequence mode may be selected and implemented during a startup operation of the flowmeter.

The plurality of operational modes includes a zero-output mode, in which a magnitude of the drive signal is substantially zero. The plurality of operational modes may include a positive feedback mode, in which a sensor signal is processed and supplied to the driver. The plurality of operational modes may include a digital synthesis mode, in which the drive signal is digitally synthesized, based on an analysis of the sensor signal.

The details of one or more implementations are set forth in the accompanying drawings and the description below. Other features will be apparent from the description and drawings, and from the claims.

DESCRIPTION OF DRAWINGS

FIGS. 10A and 10B are flowcharts illustrating operations of a digital flowmeter.

FIGS. 19A-19F describe a start sequence for one implementation of a digital flowmeter as applied to a bent flowtube.

DETAILED DESCRIPTION

Figure 1A:
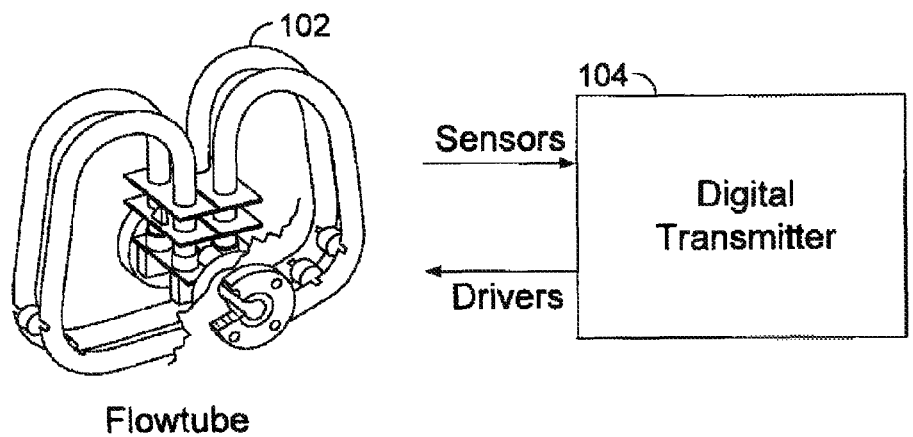
FIG. 1A is an illustration of a digital flowmeter using a bent flowtube.

FIG. 1A is an illustration of a digital flowmeter using a bent flowtube 102. Specifically, the bent flowtube 102 may be used to measure one or more physical characteristics of for example, a (traveling) fluid, as referred to above. A detailed description of a structure and operation(s) of the bent flowtube 102 is provided in, for example, commonly-assigned U.S. Pat. No. 6,311,136. Flowtubes which are similar in concept to the bent flowtube 102 are also discussed in, for example, U.S. Pat. No. 6,327,914 B1, which is incorporated by reference in its entirety.

In FIG. 1A, a digital transmitter 104 exchanges sensor and drive signals with the bent flowtube 102, so as to both sense an oscillation of the bent flowtube 102, and to drive the oscillation of the bent flowtube 102 accordingly. By quickly and accurately determining the sensor and drive signals, the digital transmitter 104, as referred to above, provides for fast and accurate operation of the bent flowtube 102.

More specifically, the digital transmitter 104 serves to select signal characteristics such as a frequency, phase, and amplitude of the drive signals, in order to obtain a desired oscillation of the bent flowtube 102, e.g., an oscillation which aligns these signal characteristics of the sensor and drive signals with one another, at a natural resonant frequency of the bent flowtube 102. For example, the digital transmitter 104 may generate the drive signals by applying the sensor signals (perhaps with suitable adjustments) as the drive signals, as part of a feedback loop. As another example, the digital transmitter 104 may generate the drive signals by synthesizing a new signal having the desired characteristics.

Figure 1B:
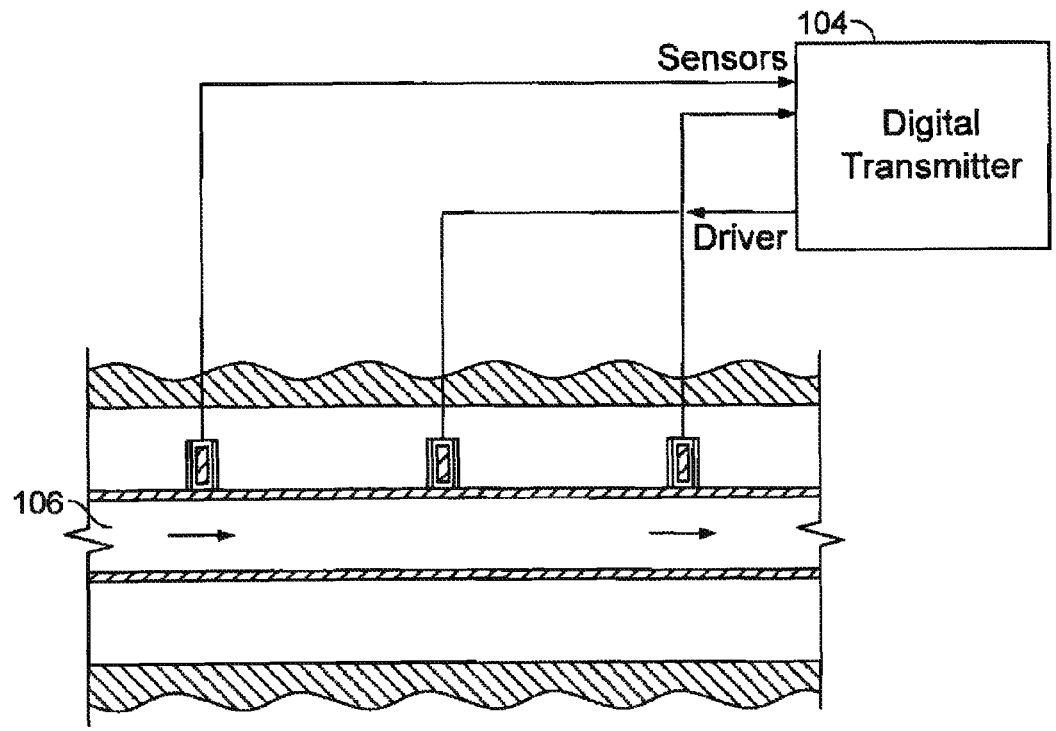
FIG. 1B is an illustration of a digital flowmeter using a straight flowtube.

FIG. 1B is an illustration of a digital flowmeter using a straight flowtube 106. More specifically, in FIG. 1B, the straight flowtube 106 interacts with the digital transmitter 104 to produce, for example, density and/or mass flow measurements. Such a straight flowtube operates similarly to the bent flowtube 102 on a conceptual level, and has various advantages/disadvantages relative to the bent flowtube 102. For example, the straight flowtube 106 may be easier to (completely) fill and empty than the bent flowtube 102, simply due to the geometry of its construction. In operation, the bent flowtube 102 may operate at a frequency of, for example, 50-110 Hz, while the straight flowtube 106 may operate at a frequency of, for example, 300-1,000 Hz.

Various relevant details of the structure and operation(s) of the bent flowtube 102 and/or the straight flowtube 104 are discussed below. However, such description is not intended to be an exhaustive description of such flowtubes, of which many conventional examples exist. Rather, the flowtube description(s) provided herein are intended to provide context for the below description of a structure and operation of the digital transmitter 104.

More specifically, the digital transmitter 104, as described in more detail below, is capable of initiating and maintaining a flowtube oscillation, such that the drive signals output by the digital transmitter 104 are compensated for phase delays caused by analog and/or digital elements within or associated with the digital transmitter 104. In this way, the drive signals have a desired phase relationship with the oscillation of the particular flowtube being used (i.e., with the sensor signals detected at the flowtube). As shown in the examples below, such phase compensation may be implemented in a variety of ways, for a number of uses in different settings. Specifically, for example, digital drive techniques described herein may be applied to a variety of flowtubes and flowtube geometries.

Figure 2:
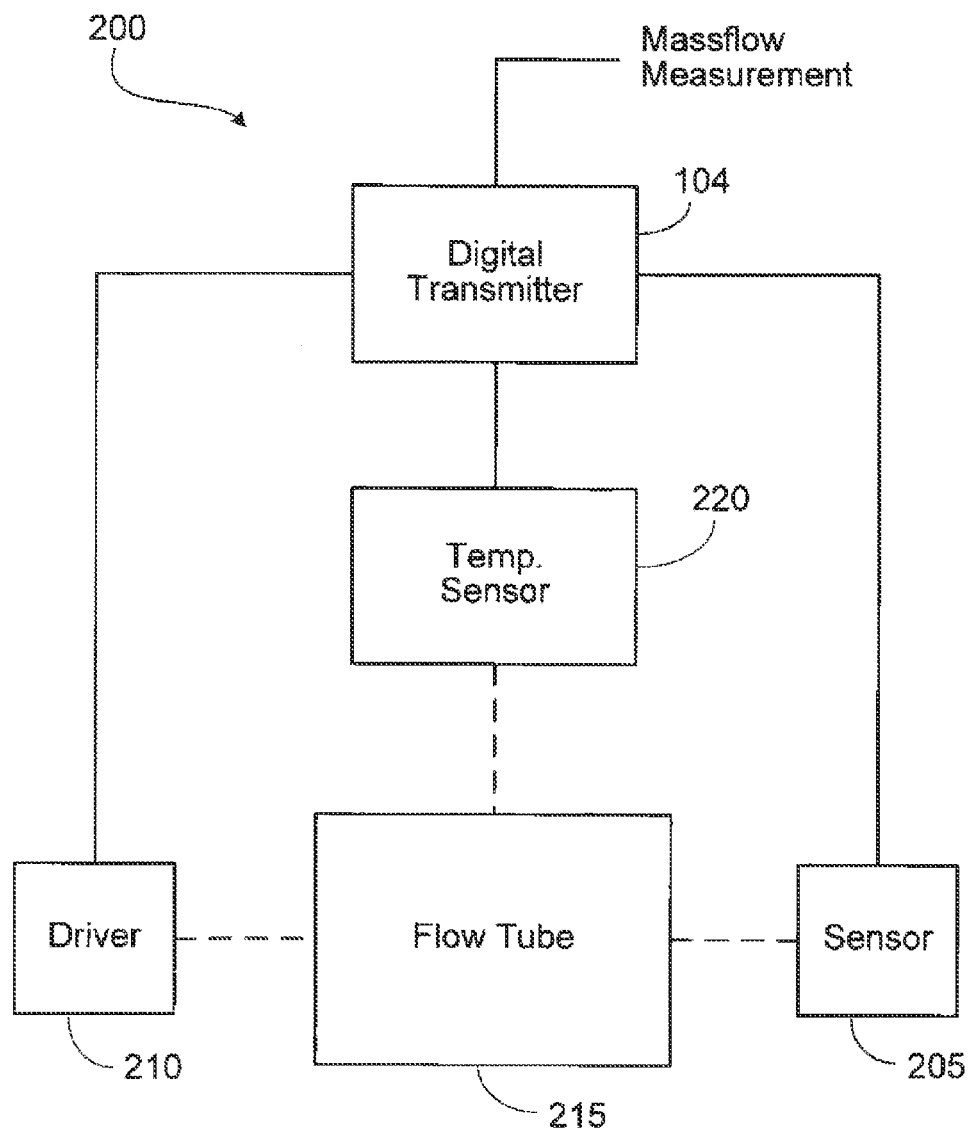
FIG. 2 is a block diagram of an operation of a digital flowmeter.

Referring to FIG. 2, a digital mass flowmeter 200 includes the digital transmitter 104, one or more motion sensors 210, one or more drivers 215, a flowtube 220 (which also may be referred to as a conduit, and which may represent either the bent flowtube 102, the straight flowtube 106, or some other type of flowtube), and a temperature sensor 220. The digital transmitter 104 may be implemented using one or more of, for example, a processor (including a Digital Signal Processor (DSP)), a field-programmable gate array (FPGA), an ASIC, other programmable logic or gate arrays, or programmable logic with a processor core. Examples of implementations of the digital transmitter 104 are discussed in more detail below.

The digital transmitter 104 generates a measurement a mass flow through the flowtube 215, based at least on signals received from the motion sensors 205. The digital transmitter 104 also controls the drivers 210 to induce and sustain motion in the flowtube 215. This motion is sensed by the motion sensors 205.

Mass flow through the flowtube 215 is related to the motion induced in the flowtube in response to a driving force supplied by the drivers 210. In particular, mass flow is related to the phase and frequency of the motion, as well as to the temperature of the flowtube has this temperature reflects the temperature of the flowing material, which also may be directly measured). The digital mass flowmeter 200 also may provide a measurement of the density of material flowing through the flowtube. The density is related to the frequency of the motion and the temperature of the flowtube. Many of the described techniques are applicable to a densitometer that provides a measure of density rather than a measure of mass flow.

The temperature in the flowtube 215, which is measured using the temperature sensor 220, affects certain properties of the flowtube, such as its stiffness and dimensions. The digital transmitter 104 compensates for these temperature effects. The temperature of the digital transmitter 104 affects, for example, an operating frequency of the digital transmitter 104, a sampling rate of an analog-to-digital converter, and/or a crystal frequency associated with a reference clock used by the transmitter 104. In general, the effects of transmitter temperature are sufficiently small to be considered negligible. However, in some instances, the digital transmitter may measure the transmitter temperature using a solid state device, and may compensate for effects of the transmitter temperature. Although not shown in FIG. 2, similar comments and considerations may be applied with respect to a pressure sensor that is operable to sense a pressure of a fluid flowing through the flowtube 215.

As referred to above, control of the drive signal sent to driver 210 for inducing vibration of the flow-tube 215 is a factor in starting and operating a digital flowmeter. More specifically, it is desirable to maintain precise control over the frequency, phase and amplitude of the drive signal.

With respect to frequency, it should first be understood that flowtube vibration is generally determined by physical characteristics of the flowtube 215 itself. In particular, the flowtube 215 will generally have a high Q factor, thereby ensuring that only a very narrow band of frequencies around the natural frequency of the flowtube generate a low-damped response in the desired mode of vibration and thereby permit the type of system operation desired. Therefore, it is desirable to match the natural frequency of the flowtube as closely as possible in the drive waveform.

Failure to perform this frequency matching will thus generally result in energy being wastefully imparted to the system at other frequencies. Moreover, frequencies which are close (but not equal to) the resonant frequency of the flowtube 215 may result in an operation of the flowtube 215 at those frequencies. In such situations, errors may result in calculations of for example, a massflow and/or density of the fluid traversing the flowtube 215.

One way that improper frequencies are generated during flow peter start-up is by generating harmonics of the natural frequency within the drive signal. Generally speaking, flowtubes have several modes of vibration. Usually only two vibration modes are of interest: the "driven mode" which is the main mode of oscillation, and the "coriolis" mode at which the coriolis forces are manifest, leading to phase offset between the sensors observed in the driven mode. In "one-drive" flowtubes, the driven mode is usually the lowest mode of vibration of the flowtube, and the coriolis mode is the next highest mode of vibration. In a "two-driver" design for the bent flowtube 102, the driven mode may be, for example, the second mode of vibration (e.g., 70-90 Hz), and the coriolis mode may be at the fundamental, lower frequency (e.g., 50-60 Hz). In any case, any other harmonic frequencies generated beyond those desired for a particular mode of vibration may result in inefficient and/or inaccurate operation of the system.

Another way that improper frequencies may be generated is through the presence of a phase offset between the sensor signal and the drive signal. That is, as this phase offset increases, the vibration changes from being at the desired natural frequency to a forced oscillation. As this phase offset is typically a function of frequency (e.g., a constant time delay of 5 ms may correspond to a phase offset of 180 degrees at 100 Hz, but may correspond to 360 degrees (i.e., 0 degrees) at 200 Hz), a phase offset close to 180 degrees for a particular frequency will typically result in stalling of the oscillation at that frequency. Conversely, a phase offset close to a multiple of 360 degrees for a given frequency will often result in oscillation of the flowtube 215 at that frequency (even if it is not the desired natural frequency).

Also with respect to phase, it should be understood that, as is known, the drive waveform should be at 90 degrees out of phase with the motion of the flowtube in order to affect vibration at the natural resonant frequency. However, if a flowtube design uses velocity sensors, which automatically provide a signal at 90 degrees to the motion of the flowtube, then the optimal drive waveform is one which is in phase with the sensor voltage signals. Thus, it should be understood that the phrases such as "in phase," "having the proper phase," "having the proper phase offset" and similar phrases refer to the condition in which the drive signal has a relationship with the sensor signal such that it affects proper vibration of the flowtube.

Once vibration at the proper frequency has been initiated and maintained, the amplitude of the drive signal must be set so that a proper amount of energy (and thus, amplitude of vibration at the chosen frequency) is actually imparted to the flowtube. Ideally, the amplitude should be frequently updated so as to ensure a constant amplitude of the oscillation of the flowtube.

As referred to above, implementations may use different techniques for obtaining drive signals which have the desired frequency, phase, and amplitude characteristics. One such technique is referred to herein as "positive feedback," in which a sensor signal (having the desired frequency and phase characteristics) is multiplied by a drive gain factor (either by analog or digital control loop techniques) and fed back to the flowtube via the drive signal. A non-linear amplitude control algorithm may be used to provide stable oscillation and selection of a sustainable set-point for an amplitude of oscillation, even during situations such as a highly-damped operation of the flowtube 215 (e.g. two-phase flow), or beginning/ending operation of the flowtube 215 in an empty state.

While this approach, by itself, may be adequate in some conventional flowmeter applications, it may not be effective when dealing with difficult situations such as hatching to/from empty and two-phase flow. In these cases, flowtube stalling, where oscillation ceases and measurements cannot be calculated, may occur.

A second technique for generating desired drive signals is digital synthesis of the drive signals. That is, rather than simply feeding back the sensor signals as the drive signals, the digital transmitter 104 may actually synthesize pure sine waves having the desired drive signal characteristics. As in the case of positive feedback above, a non-linear amplitude control algorithm may be used to provide stable oscillation and amplitude set-point selection.

Moreover, the use of digital synthesis of drive signals results in a high precision in producing the drive signals, and prevents the feeding back of unwanted frequency components that may be present in the sensor signals. However, the use of the digital transmitter 104, as well as other factors, may introduce delays into the highly-precise, synthesized signals (as well as into the fed-back sensor signals used in the positive feedback mode), relative to the originally-detected sensor signals. These delays, if not accounted for, may result in the use of drive signals having undesirable signal characteristics. Examples of sources of these delays, as well as techniques for dealing with the delays in various settings, are discussed in more detail below.

Figure 3:
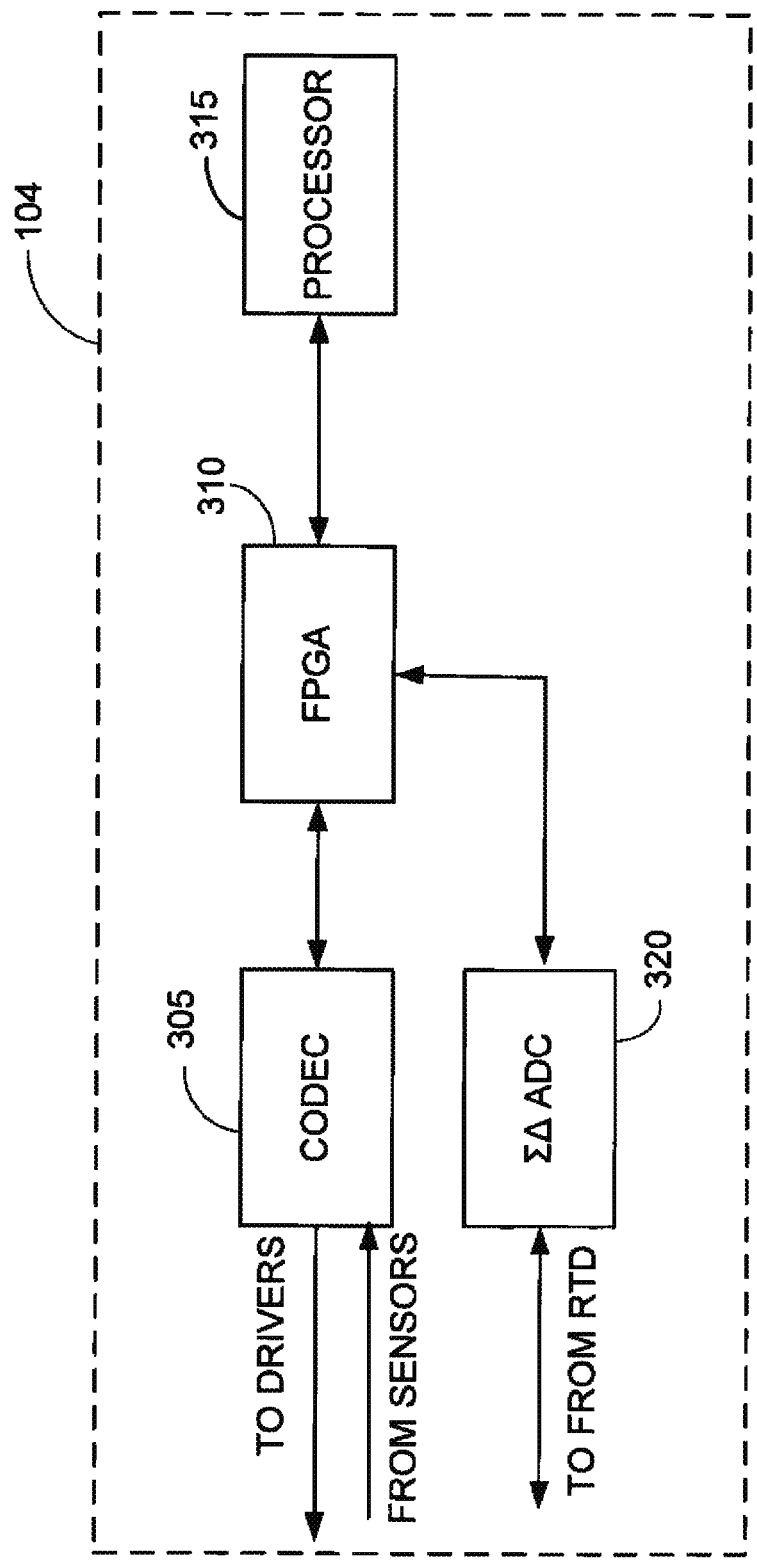
FIG. 3 is a block diagram of the digital transmitter of FIG. 2.

FIG. 3 is a block diagram of the digital transmitter 104. In FIG. 3, a codec (coder-decoder) block 305 includes analog-to-digital converters (ADCs) and digital-to-analog converters (DACs) (as shown in more detail in FIG. 4). The codec 305, in performing its conversion/deconversion operation(s), introduces delays into signals traveling therethrough, which may be hereafter referred to as the group delay of the codec 305. For a given codec group delay (in samples), a higher phase offset (in degrees/radians) results from a higher frequency of vibration of the flowtube 215 (since there will be fewer samples per cycle in this case). The CODEC 305 may be, for example, a dual ADC/DAC device which provides two 24 bit ADC and two 24 bit DAC channels, at a sampling rate Fs of 40 kHz.

A Field Programmable Gate Array (FPGA) 310 provides gates of programmable logic, which allow the FPGA 310 to perform critical real-time tasks. These tasks include, for example, the synthesis of the drive signal waveforms and peripheral control, as well as various buffering and filtering techniques performed on the sensor signals. A processor 315 is used to execute high-precision and computationally-intensive algorithms for measurement and control of variables involved with the flowmeter 200. For example, the processor 315 directs the FPGA 310 in its tasks. The processor may run under an operating system such as, for example, the VxWorks Real-Time Operating System. A block 320 represents a "sigma-delta" type, analog-to-digital converter that communicates with a resistance temperature device (RTD) to obtain flowtube temperature data.

It should be understood that, as mentioned above, all of the tasks performed by the FPGA 310 and/or the processor 315 could be performed by just the processor 315, and/or by other suitable hardware, such as, for example, an ASIC. The architecture of the digital transmitter 104 of FIG. 3, however, splits tasks between the FPGA 310 and the processor 315 in the manner just described, taking advantage of the fact that the tasks performed by the FPGA 310 may be more effectively and efficiently executed in true parallel with the processor 315, on dedicated hardware, rather than by time slicing on the (single) processor 315.

In one operation, then, sensor signals from the sensors 205 are received by two ADC channels in the CODEC 305, which operates under the control of the FPGA 310. After processing, buffering, and/or filtering the sensor signals, as described in more detail below, the FPGA 310 presents the data to the processor 315 for detailed analysis.

In one implementation, the sensor signals are input through the input channels of the CODEC 305, buffered within the FPGA 310, and fed back through the output channels of the CODEC 305 to the flowtube 215 as drive signals within a positive feedback loop. In another implementation, the processor 315 also determines drive signal parameter values for maintaining flowtube oscillation, which are then passed to the FPGA 310, which synthesizes the required drive output signals and passes them to the output channels of the CODEC 305. Thus, in these and other implementations discussed below, drive signals are passed to drivers 210 that generate a stable oscillation of the flowtube 215 at a desired frequency.

In addition to its processing related to this generation of desirable drive signals, the processor 315 also determines measurements of various process variables from the sensor signals, such as mass flow and/or density, the determination of which may represent a primary purpose of operation of the digital flowmeter 200. For purposes of determining these measurements, the sensor signals may be presented to the processor 315 largely apart from (e.g., in parallel with) the various techniques discussed herein for generating desirable drive signals.

For example, although various buffering techniques are discussed below for the purposes of generating the drive signals, separate (faster) buffering of the sensor signals may be performed for sending the sensor signals to the processor 315 for measurement purposes. In this way, measurements may be obtained quickly, without having to wait for processing of the sensor signals that is related to drive signal production. For example, the digital flowmeter 200 may be able to rapidly respond to (e.g., output measurements related to) impulse signals included within the sensor signals.

As referred to above, various sources of delay are associated with the digital transmitter 104. One possible source of delay is the group delay associated with the CODEC 305. Another possible source of delay is filtering which may take place within the FPGA 310, e.g., filtering which is designed to remove unwanted harmonics from the sensor signals detected by the sensor 205 (particularly during start-up of the flowmeter), and/or filtering designed to improve measurement quality (e.g., reduce noise during two-phase flow or add precision for a pure gas measurement). Other possible sources of delay include the use of barrier circuitry at the drive output, which may be included as a safety precaution, or signal shifts due to temperature effects and/or component aging. Such analog and/or digital delays as those just mentioned, as well as other delays not explicitly discussed, may result in a non-trivial phase offset at the desired (natural) frequency of vibration of the flowtube 215.

Techniques for compensating for these delays may depend on, for example, the type of delay actually present, and/or a current mode of operation of the digital transmitter 104. For example, when the digital transmitter 104 is operating in a positive feedback mode, the group delay of the CODEC 305 may be calculated based on, for example, the type of CODEC 305 being used, a number of measurement samples being taken at a given sample rate, and/or a resonant frequency of the particular flowtube being used. A buffer may then be included which delays the sensor signal from being input to the driver 210, until a phase match between the sensor signal and the drive signal will occur. For example, the output waveform from the sensor 205 may be buffered within the FPGA 310, and a value may be selected from the buffered output waveform that corresponds to the current phase point of the sensor signal, but from the previous cycle of that signal.

As another example, when the digital transmitter 104 is operating in either a positive feedback mode or a synthesis mode, the filtering of the sensor signal may provide delay that is in addition to the group delay of the CODEC 305. Depending on the type of filter used, this filter delay may be more difficult to predict than the group delay of the CODEC 305. For example, in an elliptical filter such as the one described below, a delay caused by the filter may be a non-linear function of frequency. Moreover, at a given point in time (for example, at or near a start-up of oscillation of the flowtube 215) a natural frequency of the flowtube 215 may not be accurately known, making a determination of filter delay even more problematic.

In one implementation, then, the filter delay is determined by actually measuring an appropriate frequency, determining the associated filter delay using the pre-determined non-linear function associated with the filter being used, and then waiting a pre-determined amount of time after a trigger signal to begin drive signal synthesis. For example, the pre-determined amount of time may be determined from considering both the group delay and the filter delay. The trigger signal may be a positive zero-crossing of a weighted sum of the filtered sensor signal(s) (i.e. a calculated mid-point between two separate signals), or of just one of the filtered sensor signals.

Figure 4:
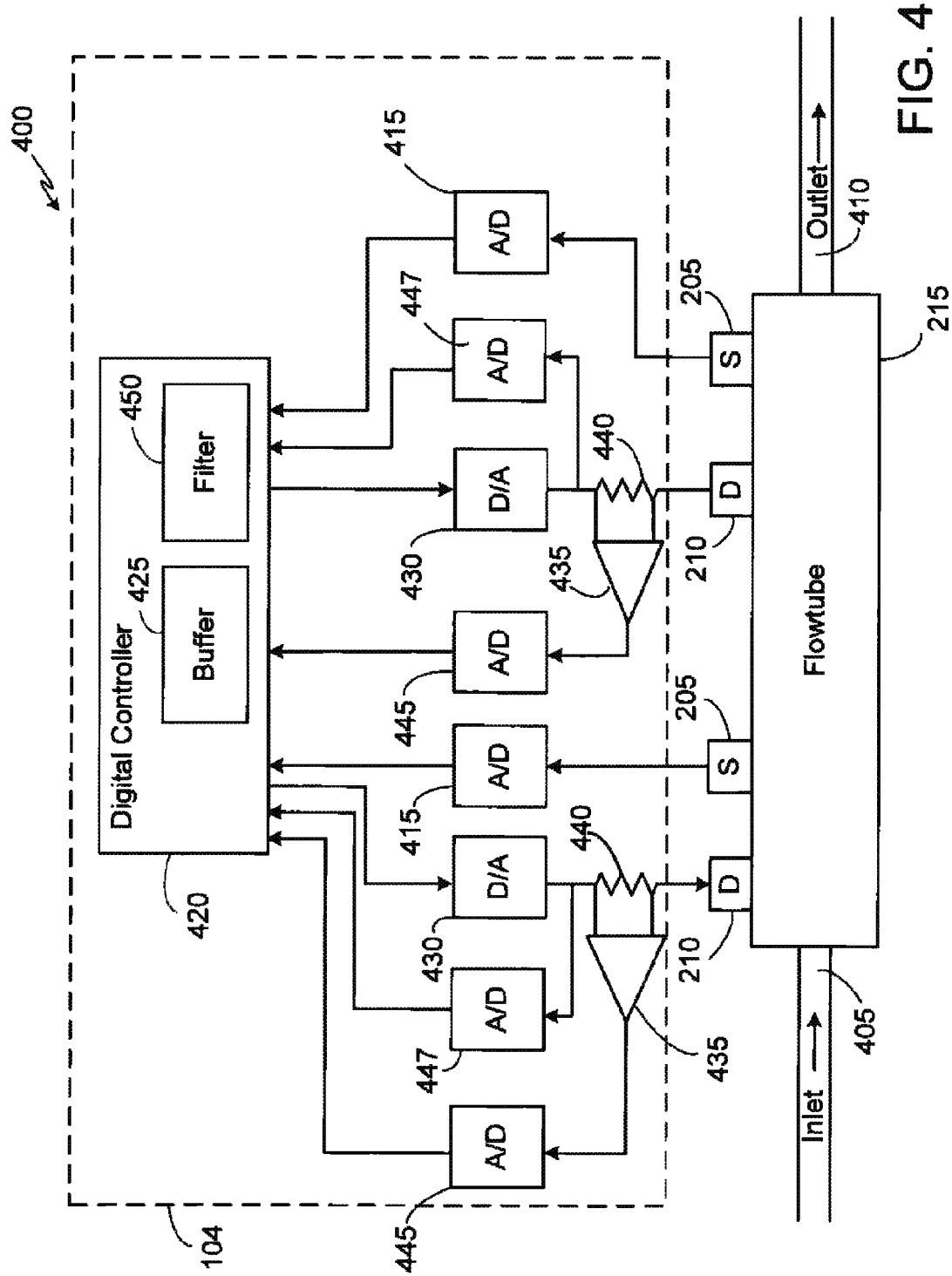
FIG. 4 is a block diagram of a digital flowmeter.

FIG. 4 is a block diagram of a digital flowmeter 400. In FIG. 4, flowtube 215 receives fluid flow through inlet 405 and outputs the fluid through outlet 410. Sensors and drivers 205 and 210, respectively, operate generally as described with respect to FIG. 2. A/D converters (ADCs) 415 receive the sensor signals and convert the analog signals into digital signals at a sampling rate of, for example, 40-80 Hz or higher, for input into the digital transmitter 104. ADCs 415 may be considered to be a part of the CODEC 305 of FIG. 3.

A digital controller 420 receives the sampled sensor signal for processing. The digital controller 420 may include the FPGA 310 and the processor 315 of FIG. 3, or may include some other combination of hardware and/or software for processing the sampled sensor signal and outputting an appropriate drive signal.

As referred to above, the digital controller 420 selects a gain factor for the drivers 210, based on voltages detected by the sensors 205, in order to maintain a desired amplitude of flowtube oscillation. In one implementation, such gain factor selection operates at a slow rate relative to the resonant frequency of the flowtube being used (e.g., the driver gain factor may be updated only once per cycle or half-cycle, for example, 80-160 Hz). This is because, for oscillation stability, accurate measurement of amplitude is more important than very rapid updating of the driver gain, and amplitude calculation based on complete cycles of data may thus provide accurate estimates.

In the digital flowmeter 400, a buffer 425 may be used during a positive feedback operation. An example of this positive feedback operation is described in more detail below, for example, with respect to FIG. 5. In the positive feedback operation, the buffer 425 stores samples of the signal received from ADC 415, and outputs a signal to D/A converters (DACs) 430, such that the signal output by DAC 230 and delivered as the drive signal to the driver 210 is substantially in phase with the signal originally received by ADC 215. In this way, a positive feedback loop is maintained which permits generation of a drive signal waveform having the so desired phase relationship with the sensor signal waveform.

Op amps 435, resistors 440 and ADCs 445 operate to measure the current to the drivers 210, and return this information in digital form to the digital controller 420. In this way, a feedback loop is maintained which allows an additional, or alternative, technique for compensating for the sources of delay referred to above. Somewhat similarly, further A/D converters 447 may be used to measure a voltage at an output of the D/A converters 430, which may similarly be fed back to the digital controller 420. Such "closed-loop" techniques are discussed in more detail with respect to FIG. 15.

In the example of FIG. 4, the ADCs 415 may introduce a delay of 31 samples, while DACs 230 may introduce a delay of 30 samples, for a total group (CODEC) delay of 61 samples. Assuming a sampling rate of 40 kHz and an input waveform of 95 Hz, a phase offset of approximately 50 degrees may be introduced. This degree of phase offset may be sufficient to cause the flowmeter to oscillate off-resonance. With other sampling/oscillation frequencies, phase offsets approaching 180 degrees can be created, in which case the flowtube will likely not oscillate in the desired mode, but will likely find some higher mode of vibration where the phase offset is close to a multiple of 360 degrees.

The buffer 425 is large enough to contain at least one full cycle of data, e.g., 2048 entries. Buffer 425 can be circular, so that the oldest entry is overwritten by the newest entry. If a sample rate of 80 kHz is assumed when the flowtube frequency is 80 Hz, then a full cycle can be held within 1000 samples. Still assuming, for the sake of example, a group delay of 61 samples, then digital transmitter 104 should select the value from buffer 425 stored 939 samples ago, in order to reduce or eliminate any phase offset between the sensor and drive signals. In other words, buffer 425 should select the value corresponding to the actual current phase point, but from the previous cycle. This "phase-matched output" is then multiplied by the desired drive gain to give the drive output. In one implementation, the above-described use of buffer 425 was sufficient to reduce phase offset to within one CODEC sample; i.e., at 95 and 80 kHz, ±0.4 degrees. A more detailed discussion related to determining a CODEC delay relative to a given sampling rate and flowtube frequency is provided below, with respect to FIGS. 5, 6 and 16-18.

Figure 5:
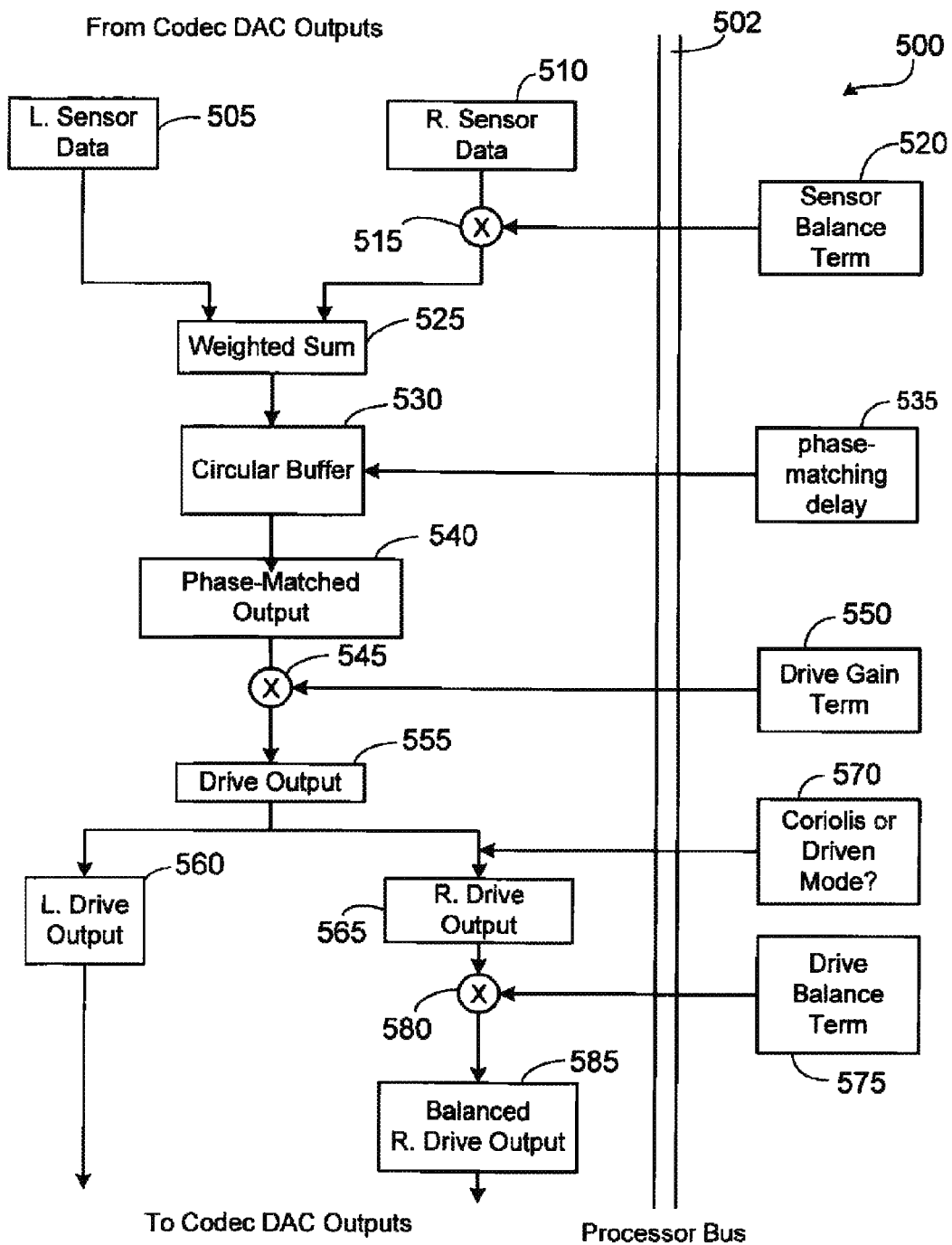
FIG. 5 is a flowchart illustrating a positive feedback mode of operation of the system of FIG. 4.

FIG. 5 is a flowchart 500 illustrating a positive feedback mode of operation of the system 400 of FIG. 4. In FIG. 5, a processor bus 502 relays information between the digital controller 420 and other components of the digital transmitter 104. In flowchart 500, outputs of ADCs 415 are input by the digital controller 420 as left sensor data (505) and right sensor data (510). The right sensor data is multiplied (515) by a sensor balance term (520), which represents a ratio between the amplitudes of the left/right sensor signals. Typically, this ratio is expected to be close to 1.0. Multiplying the right sensor data by the sensor balance term ensures that it has the same amplitude as the left sensor data prior to a weighted summation of the two signals (525), which in turn prevents the summation from introducing unwanted harmonics.

The weighted sum may be convenient in that it provides a representation of a single sensor signal, i.e., a "virtual" signal representing, for example, a mid-point between the left and right (actual) sensor signals. Such a virtual signal, for example, allows calculations to proceed without consideration of a phase difference that may exist between sensor signals from the right and left sensors. However, as discussed in more detail below, it is not necessary to calculate the virtual weighted sum, as either of the actual sensor signals could be individually used as the basis for further calculations.

Whichever sensor signal type is used is then buffered in a circular buffer (530), such as the buffer 425. It should be understood that buffer 425 may be implemented as a synthetic buffer within the FPGA 310, or could be a separate circuit element, or could take any other conventional form, such as a memory known to implement a buffering process.

The amount of buffering depends on a maximum number of samples taken over a full cycle of the sensor signal(s) at the selected (operating) frequency. For example, for a sampling rate of 10 kHz and an operating frequency of 100 Hz, each oscillation cycle of the flowtube corresponds to 100 samples to be stored in the buffer 425. Alternatively, for a sampling rate of 10 kHz and an operating frequency of 50 Hz, each cycle corresponds to 200 samples to be stored in the buffer 425.

A phase-matching delay term 535 is used to select an output of the buffer 425 that corresponds to a current phase point, but from the previous (stored) cycle. In this way, a phase-matched drive signal is generated and output (540); in other words, a drive signal having a phase that is matched with the sensor signals) is output and delivered to the driver 210 for oscillating the flowtube 215.

Figure 6:
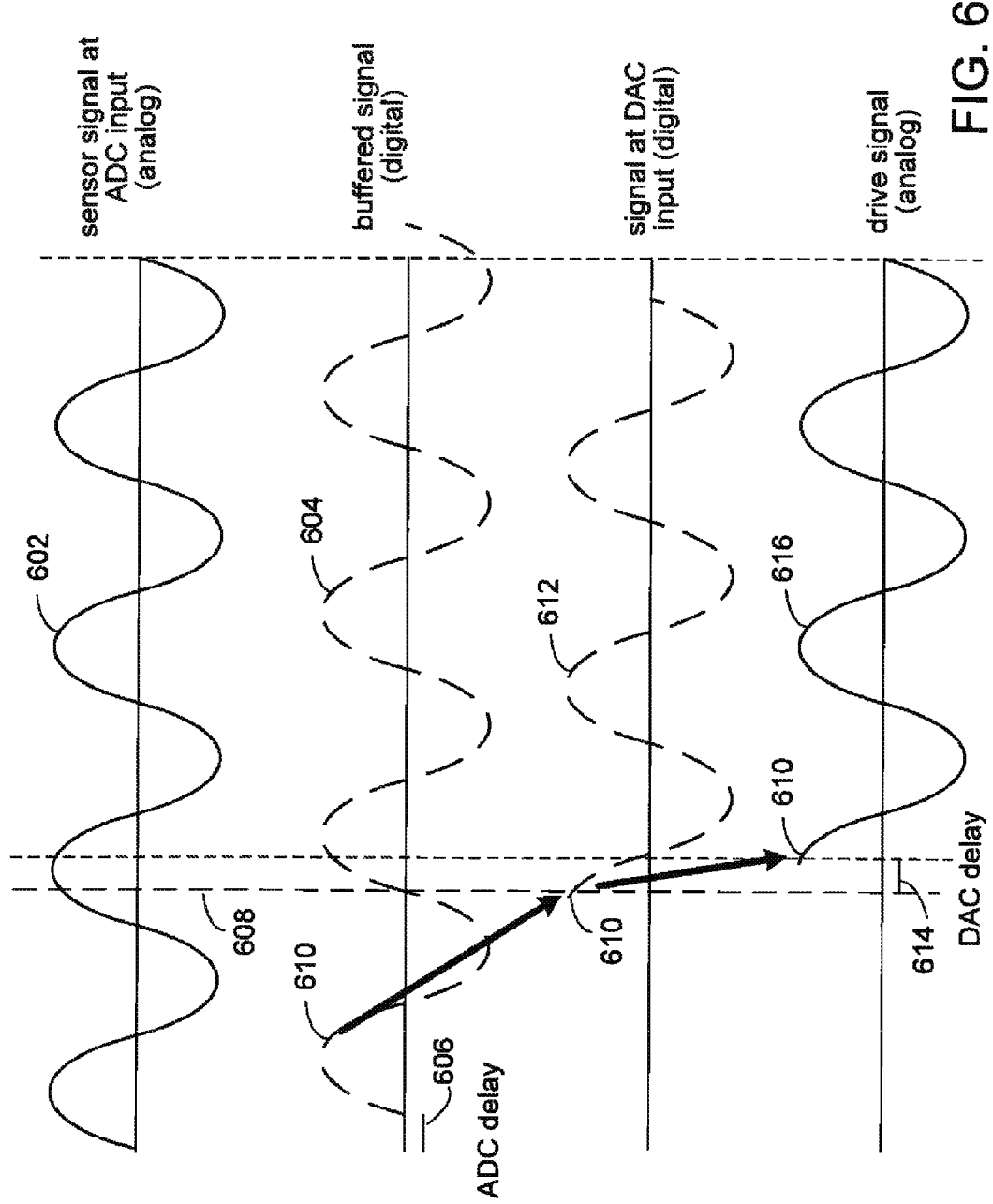
FIG. 6 is a timing diagram illustrating a buffering process implemented during the positive feedback operation of FIG. 5.

As shown in more detail in FIG. 6, this process of phase-matching involves correlating a given CODEC delay to a number of samples stored in the buffer 425. For example, as discussed so above with respect to FIGS. 3 and 4, a CODEC delay may be 61 samples. If the buffer stores 100 samples per cycle (e.g., as in the above example of a 10 kHz sampling rate and 100 Hz flowtube osculation), then, at a given moment, the sample stored 39 samples ago is the one which, if output, will correspond to a current value of the sensor signal(s). In the example of 200 samples per cycle (e.g., assuming a 10 kHz sampling rate and 50 Hz resonant frequency), then the appropriate buffered value to select would be the one stored 139 samples ago.

Once determined, the phase-matched drive signal may then be multiplied (545) by a drive gain term (550), so that a desired drive signal output is produced (555). Subsequently, the drive signal output can be separated into a left drive output (560) and a right drive output (565) (alternatively, in the case of a one-drive system, only one drive output may be produced and/or used as a drive signal). Depending on whether the processor selects coriolis or driven mode (570), the right drive output is equal to or the negation of, respectively, the left drive output. Finally, a drive balance term (575) is applied to the right drive output (580), in order to allow fine tuning of the drive balance and compensate for any analog circuitry variations that may exist, thereby producing a balanced right drive output (585).

FIG. 6 is a timing diagram illustrating a buffering process implemented during the positive feedback operation of FIG. 5. In FIG. 6, a first signal 602 represents a sensor signal detected by the sensor(s) 205. The signal 602 might represent a (virtual) weighted sum of multiple sensor outputs, as shown in FIG. 5, or might represent some other combination of sensor signals, or a single sensor signal.

A signal 604 represents the signal 602, after it has traversed ADC(s) 415 and been buffered in the buffer 425. In FIG. 6, the signal 602 has experienced a delay 606, corresponding to a CODEC delay imparted on the signal 604 by the ADC(s) 415. As described above, the signal(s) 602/604, in a positive feedback mode of operation, are to be amplified by an appropriate drive gain factor or factors, and fed back to the driver 210 as a drive signal. However, as mentioned above and illustrated in FIG. 6, using the signal 604 as the drive signal would result in an undesirable phase offset between the sensor signal 602 and the ostensible drive signal 604. Indeed, this phase offset would be further exacerbated by a delay imparted by the DAC 430. Such a phase offset would result in sub-optimal flowmeter performance, such as a reduced amplitude, oscillation at undesirable frequencies, or complete stalling of the flowtube 215.

Therefore, rather than simply feeding the signal 604 back into the driver 430, at least one full cycle of the signal 604 is buffered within the buffer 425. At a point in time indicated by a line 608, a full cycle of the signal 604 has been buffered within the buffer 425. In this way, a sample 610 from the stored cycle may be selected, and a signal 612 is output by the buffer 425 that starts with the sample 610 (as should be clear, the signal 612, shown separately for the sake of illustration, may also be thought of as a time-shifted version of the signal 604).

It should be noted that the signal 612 is not in phase with the original sensor signal 602. This is because, as described above, the sample 610 is selected in consideration of the total CODEC group delay (e.g., 61 samples in the examples of FIGS. 4 and 5), not just the delay associated with the ADC 415. In other words, upon being fed into the DAC 430, the signal 612 experiences a corresponding delay 614 that has already been accounted for during selection of the sample 610.

Thus, after being multiplied by a gain factor, before being output by the DAC 430, a drive signal 616 is generated. As shown, the drive signal 616 is substantially in phase with the original sensor signal, despite the delays associated with, for example, CODEC 305.

As just described, the selection of an appropriate buffered value as the value 610 is based on, for example, the sampling rate of the CODEC 305, a group delay associated with the CODEC 305, and the operating frequency of the flowtube being driven. However, particularly during a start-up of the flowtube and/or during a system disturbance or perturbation, it is not always the case that the operating frequency is known with certainty. Examples of techniques for dealing with this uncertainty during start-up and operation of flowtube measurements are discussed in more detail with respect to FIGS. 16-18.

One factor that may impact the operating frequency of the flowtube, and thus the selection of an appropriate buffer offset, is the use of a filter 450, which is illustrated in FIG. 4 as a filter implemented in the digital controller 420. Such a filter may be used, for example, to remove unwanted frequency components that may be present in the vibration of the flowtube and detected by the sensors 205. In this way, the drive signal applied to the flowtube will be made more efficient, e.g., will be more likely to excite the resonant mode of the flowtube.

The filter 450, during its operation, also may impart non-negligible delay to the signal(s) being filtered. This delay should be accounted for, in order to ensure phase matching between the sensor signals and the drive signals.

In short, FIGS. 5 and 6 illustrate techniques for phase-matching a sensor signal with a drive signal during a positive-feedback operation. In practice, in order to implement the techniques of FIGS. 5 and 6, it may be necessary to first determine an actual, current value of an operating frequency of the flowtube (to thereby determine the buffer offset). Also in practice, the filter 450 may be used, in which case additional or alternative techniques may be used to account for an effect of the filter 450 on the operating frequency and/or a timing of the sensor/drive signals. These additional or alternative techniques are not illustrated in FIG. 6, for clarity's sake, but examples of the techniques are discussed in detail below, and these examples (with modifications, as needed) are equally applicable in the context of FIGS. 5 and 6.

More specifically, uses and effects of the filter 450 are discussed in more detail below, in the context of, for example, a digital synthesis operation. One example of such a digital synthesis operation is described with respect to FIGS. 7-9.

Figure 7:
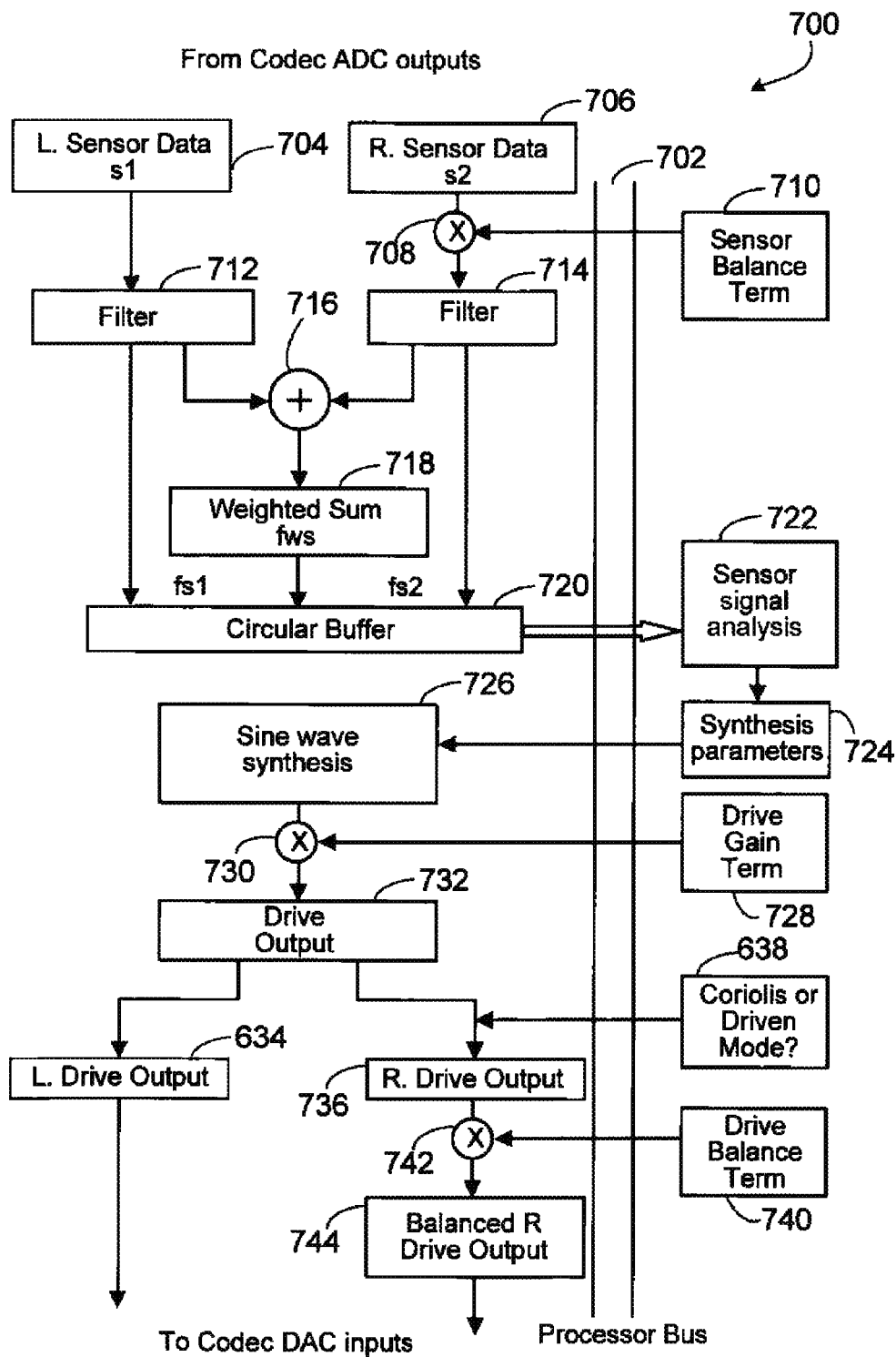
FIG. 7 is a flowchart illustrating a digital synthesis mode of operation of the system of FIG. 4.

FIG. 7 is a flowchart 700 illustrating a digital synthesis made of operation of the system 400 of FIG. 4. In FIG. 7, a processor bus 702 relays information between the digital controller 420 and other components of the digital transmitter 104. In flowchart 700, outputs of ADCs 415 are input by the digital controller 420 as left sensor data (704) and right sensor data (706). The right sensor data is multiplied (708) by a sensor balance term (710), as in the flowchart 500.

Subsequently, the left sensor data is filtered by the filter 450 (712), and the right sensor data is also filtered by the filter 450 (714), and the two filtered signals are summed (716) to provide a weighted sum (718). Alternatively, although not shown, the left and right (weighted) sensor data could be summed, and the weighted sum could then be filtered.

The filtered sensor data signals and the weighted sum are then passed to the circular buffer 425 (720). The buffer 425 passes the sensor data for signal analysis (722).

It should be understood that the buffer 425 is not necessarily used in the digital synthesis process of FIG. 7 in the same manner described above with respect to the positive feedback process of FIG. 5, i.e., to correct for phase delay by providing a selected value from a previous cycle that corresponds to a value from a current cycle. Rather, the buffer 425 may serve, for example, to hold signal data until it is required by another system component (such as a signal processor), or to save signal data in case the system 400 must shift out of the digital synthesis mode and back to the positive feedback mode (due to, for example, a loss or distortion of a current signal).

When the digital controller 420 is implemented in the manner shown in FIG. 3, i.e., using the FPGA 310 and the processor 315, the above-described features of the flowchart 700 may be performed at the FPGA 310. Subsequently, the processor 315 may perform the sensor signal analysis (722), to thereby determine synthesis parameters for the drive signals (724). For example, the processor 315 may analyze the sensor signals to measure a true frequency of the signals, from which it may calculate initial values, phase offset, or other parameters needed to synthesize a desired drive signal. These calculations are discussed in more detail below.

Once the desired drive signal is synthesized (726), a drive gain term (728) is multiplied (730) by the drive signal, to thereby generate the actual drive output (732). As in flowchart 500, the drive output can be separated into a left drive output (734) and a right drive output (736). Depending on whether the processor selects coriolis or driven mode (738), the right drive output is equal to or the negation of, respectively, the left drive output. Finally, a drive balance term (740) is applied to the right drive output (742), in order to allow fine tuning of the drive balance and compensate for any analog circuitry variations that may exist, thereby producing a balanced right drive output (744).

Figure 8:
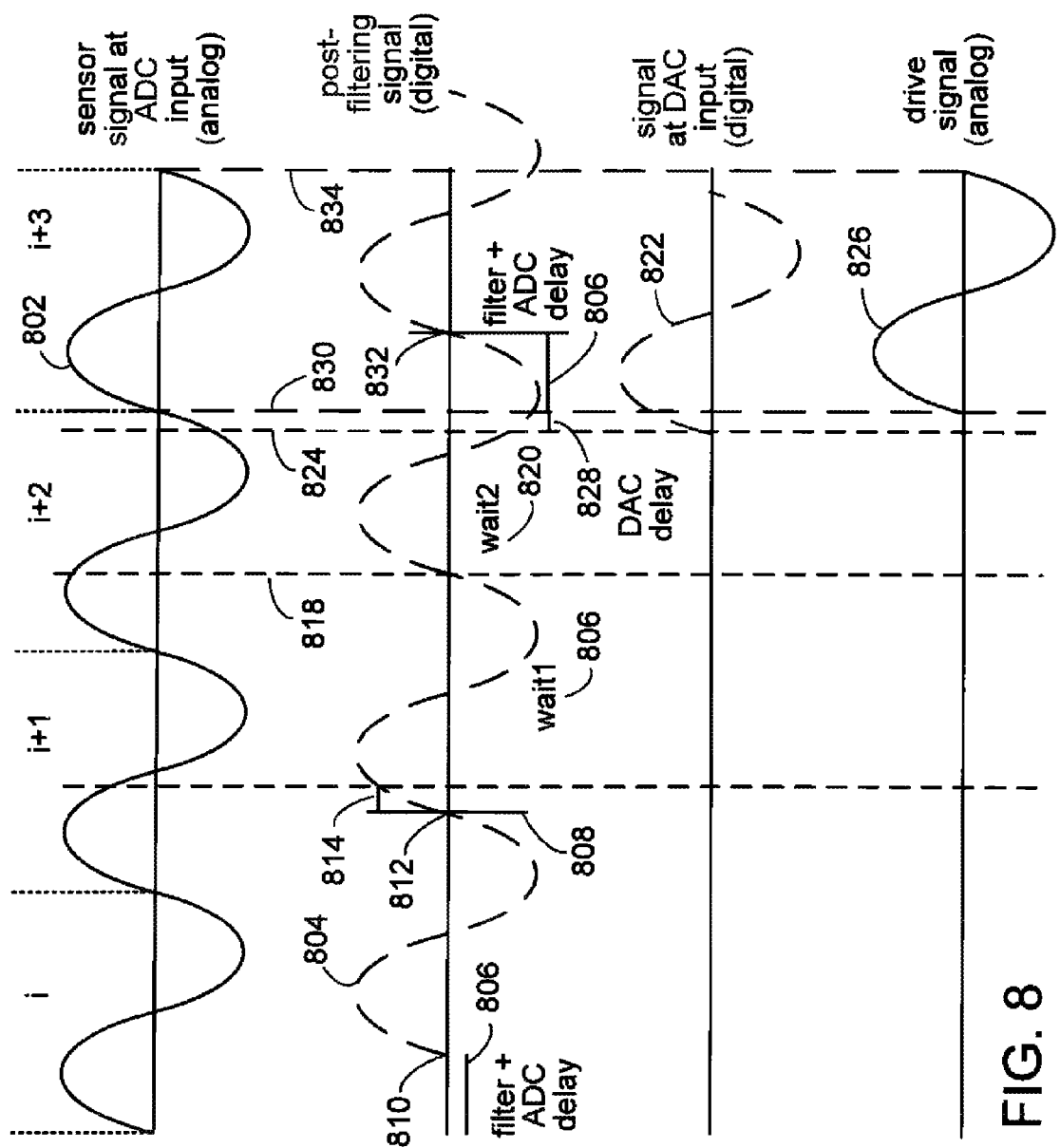
FIG. 8 is a first timing diagram illustrating a timing of a synthesis of a sine wave to be used as part of a drive signal.
Figure 9:
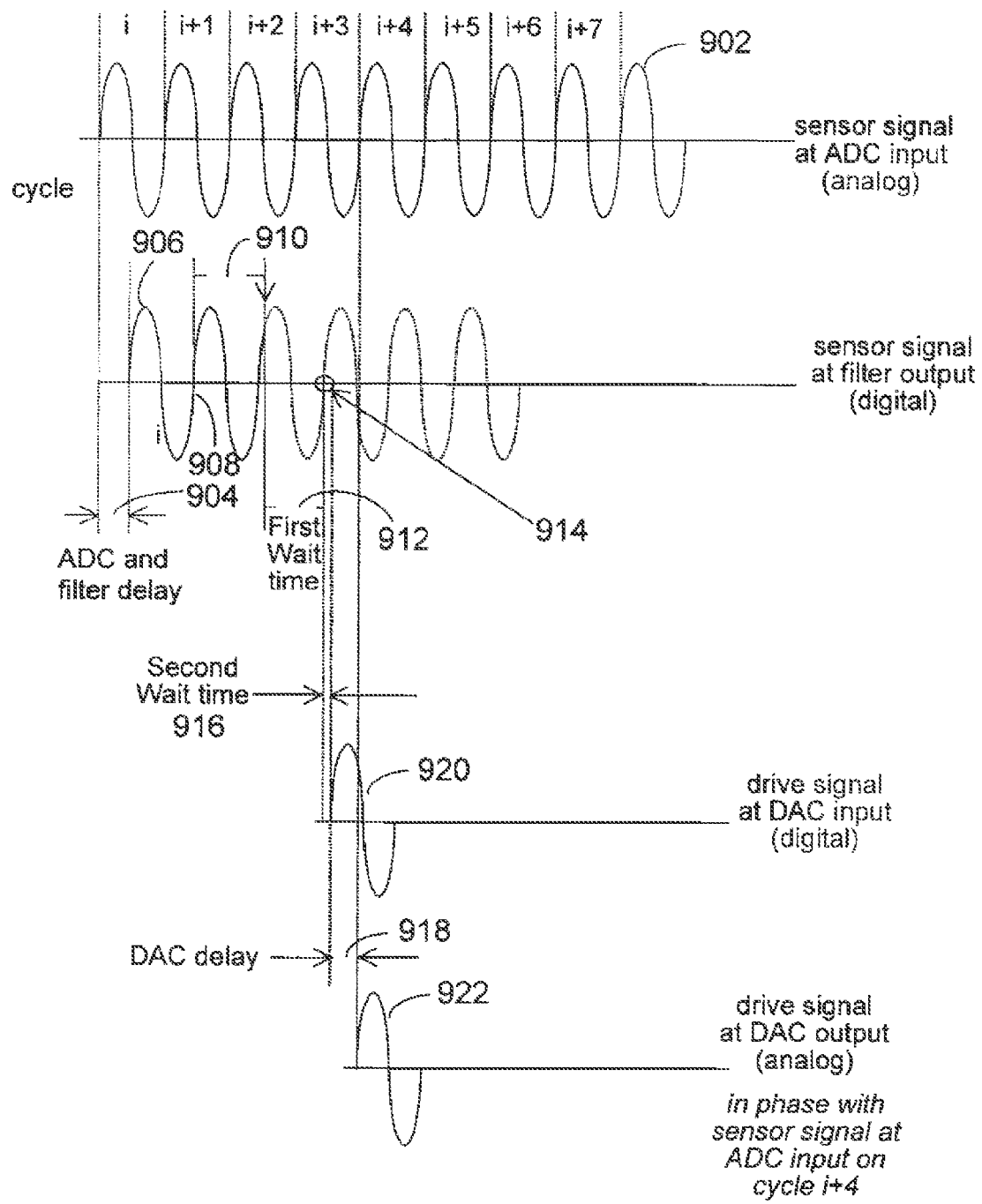
FIG. 9 is a second timing diagram illustrating a timing of a synthesis of a sine wave to be used as part of a drive signal.

FIG. 8 is a first timing diagram illustrating a timing of a synthesis of a sine wave to be used as part of a drive signal. Similarly, FIG. 9 is a second timing diagram illustrating a timing of a synthesis of a sine wave to be used as part of a drive signal. It should be noted that FIGS. 8 and 9 are primarily intended to demonstrate an example timing of a sine wave synthesis process that might be used in the synthesis mode of FIG. 7, and therefore the below discussion of FIGS. 8 and 9 includes only an overview of actual computational techniques that may be used to perform the synthesis. A more detailed explanation of possible computational techniques that may be used during sine wave synthesis, including possible roles played by the FPGA 310 and the processor 315 in implementing such techniques, is provided below with respect to FIGS. 10-14.

In FIG. 8, a first signal 802 represents a sensor signal detected at an input of ADC 415. A post-filtering signal 804 represents the sensor signal 802 having a time delay 806, where the time delay 806 represents a delay imparted to the first signal 802 by the ADC 415, as well as a delay imparted to the first signal 802 by the filter 450.

As mentioned above with respect to FIG. 7, in the implementation of FIG. 3, the FPGA 310 may perform the filtering of the sensor signal(s), as well as a calculation of a weighted sum (as described above, resulting in the signal 804) of the filtered sensor signals. In FIG. 8, it should so be understood that the signal 802 represents a virtual weighted sum, i.e. an analog signal that would be created from the analog weighted sum of the sensor signals, as opposed to the calculated weighted sum 804 calculated by, and existing within, the FPGA 310 (with a magnitude and frequency similar to that of the signal 802, but having a phase delay relative to the signal 802). The FPGA 310 may then calculate a negative-to-positive zero crossing of the signal 804, indicated in FIG. 8 by a first line 808, and send all information about the signal 804 (including the negative-to-positive zero crossing information) to the processor 315.

Figure 12:
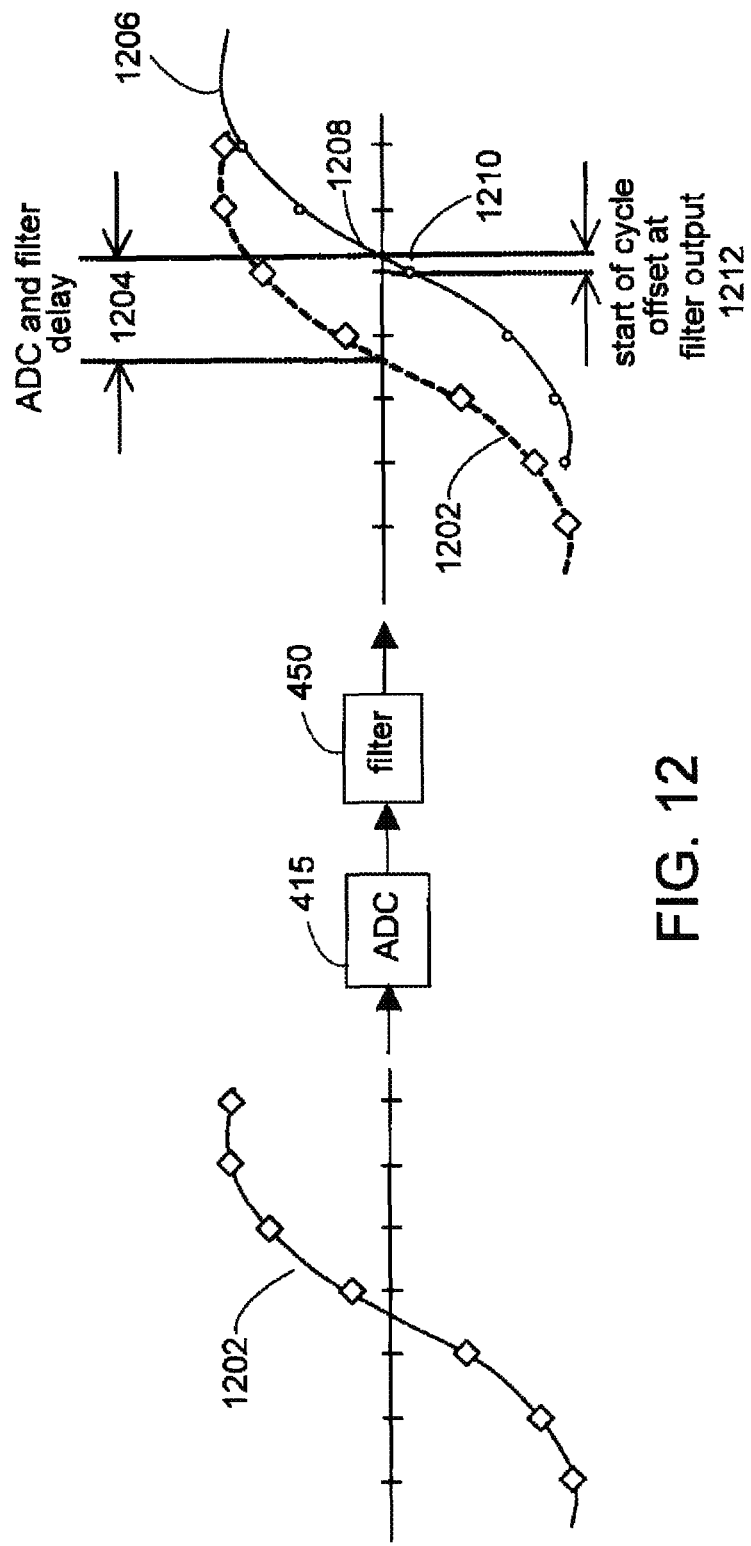
FIG. 12 is an illustration of a zero-crossing of a signal output by a filter used in an operation of a digital flowmeter.
Figure 13:
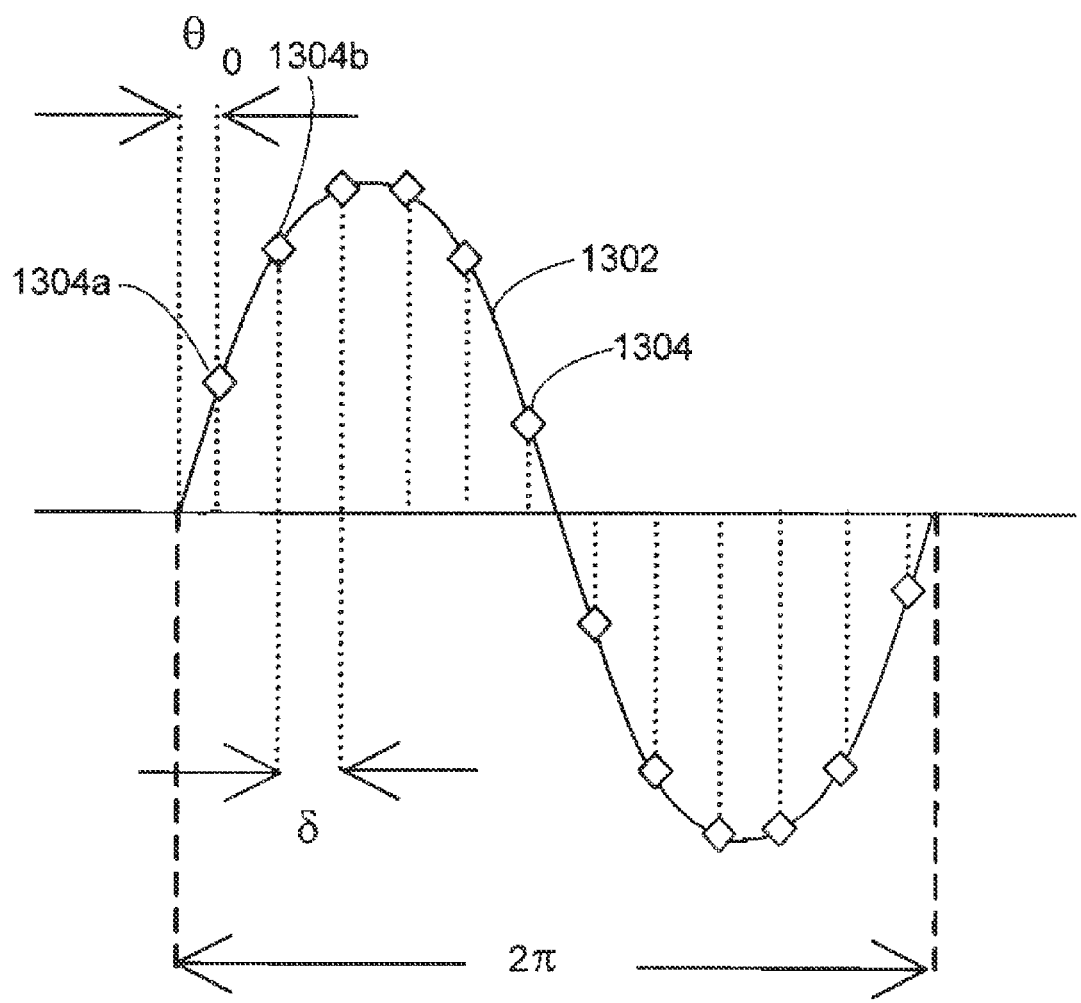
FIG. 13 is an illustration of a sine wave illustrating synthesis parameters for synthesizing a drive signal.

The processor 315 determines an average frequency ($freq_{ave}$) of the original (two) sensor signals from sensors 205, as well as a cosine (cos) and sine (sin) of an angle "δ" between samples, where the angle between samples is defined as $\delta=2\pi freq_{avg}/F_s$, where $F_s$ is the sampling rate (see FIG. 13). The frequencies can be calculated by, for example, an interpolation process, discussed in more detail below (see FIG. 12).

This calculation of frequency takes a finite amount of processing time, so that the processor 315 has the frequency information after a processing time 814. By feeding the $freq_{ave}$ value into the non-linear filter function associated with the filter 450, a corresponding filter delay of filter 450 may be determined, which together with the (already-known) ADC delay time, provides the filter+ADC delay 806.

The processor 315 also may calculate a phase offset $\Pi_0$, which reflects the fact that there may be a small time difference between an actual zero crossing and the next sampled value of the wave (see FIG. 13). This offset $\Pi_0$ may be used to obtain initial values for the sine and cosine parameters (i.e., $\sin(\Pi_0)$ and $\cos(\Pi_0)$) for the sine wave to be synthesized. The processor 310 then sends the calculated parameters to the FPGA 315, which, in turn, proceeds to wait a first wait time 816. The first wait time 816 measures from the end of the processing time 814 until the next zero-crossing, marked by a line 818.

The processor 315 also may calculate a second wait time 820, after which the FPGA 310 is to begin synthesis of a sine wave 822, at a time marked by a line 824. The second wait time 820 is selected such that the sine wave 822 synthesized by the FPGA 310 will be in phase with the sensor signal 802, when the sine wave 822 is applied to the flowtube 215 as a drive signal 826. For this condition to occur, the FPGA must synthesize the sine wave 822 such that the filter+ADC delay 806 is accounted for, thereby matching the sine wave 822 to a shifted or corrected version of the post-filtering signal 804. Furthermore, the sine wave 822 must be prospectively shifted as well, in order to account for a delay that will occur post-synthesis, e.g., the delay associated with a passing of the sine wave 822 through the DAC 430. This delay is represented as a DAC, delay 828, between the line 824 and a line 830.

Thus, the second wait time 820 may be calculated to be a total period (i.e., from the zero-crossing at the line 818 to a following zero-crossing, at a line 832), minus a total delay imposed by the digital transmitter 104, which, in the case of FIG. 8, is equal to the filter+ADC delay 806 plus the DAC delay 828. By starting synthesis of the sine wave 822 at the time marked by the line 824, then, a phase of the drive signal 826 (after the DAC delay 828) exactly matches a phase of the sensor signal 802, as shown by the line 830 and a line 834.

In the example of FIG. 8, it is assumed that the frequency/period of the sensor signal 802 is such that the processor 315 may perform its processing routines in less than one period of the signal (e.g., the time 814 is substantially less than the total period length of the wave(s)). In this case, it should be noted that the drive signal 826 is actually in phase with the "i+3" cycle of the sensor signal 802; that is, two full cycles (the "i+1" and "i+2" cycles), as explained above, are used for frequency (and related) calculations and/or as waiting periods which account for the various delays. Alternatively, it may be possible to eliminate the first, wait time 816, and begin counting for the second wait time 820 immediately after the zero-crossing at time 808. This approach requires the FPGA 315 to assume that synthesis parameters will arrive before the end of the second wait time 820, and so is a more aggressive or time-sensitive approach, but, when successful, reduces the delay from two cycles to only one cycle.

For higher frequencies, it may be the case that the calculation time 814 is comparable to, or more than, the total period length. Moreover, a processing time of the processor 315 may not be constant (due to, for example, other loads imposed on the processor 315), in which case the time 814 may substantially vary (relative to the total period length).

FIG. 9 is an example of such a situation. In FIG. 9, a sensor signal 902 experiences an ADC+filter delay 904 and is output from the filter 450 as a signal 906. At a zero-crossing 908, analysis of a cycle i of signal 906 commences, but is not completed until after a calculation time 910, which is longer than a period of the signal 906. After a first wait time 912, a zero-crossing 914 is detected by the FPGA 310, whereupon the FPGA 310 obtains the synthesis parameters (or uses synthesis parameters that have already been received from the processor 315) and waits a second wait time 916.

In FIG. 9, the ADC+filter delay 904, plus the (prospective) DAC delay 918, is cumulatively longer than a cycle of the sensor signals. Therefore, in a first implementation, the second wait time 916 may be correspondingly longer then the cycle length, as well. In this implementation, a signal 920 is input to the DAC 430 after the second wait time 916, so that, after the DAC delay 918, a drive signal 922 is generated that is in phase with the "i+5" cycle of the sensor signal 902.

Alternatively, in a second implementation, as shown in FIG. 9, the second wait time 916 may be determined as a non-negative integer remainder of the total delay (expressed as a number of samples), divided by the cycle length (also expressed as a number of samples). In this implementation, the signal 920 is input to the DAC 430 after the second wait time 916, so that, after the DAC delay 918, the drive signal 922 is output that is in phase with the "i+4" cycle of the sensor signal 902.

Figure 11:
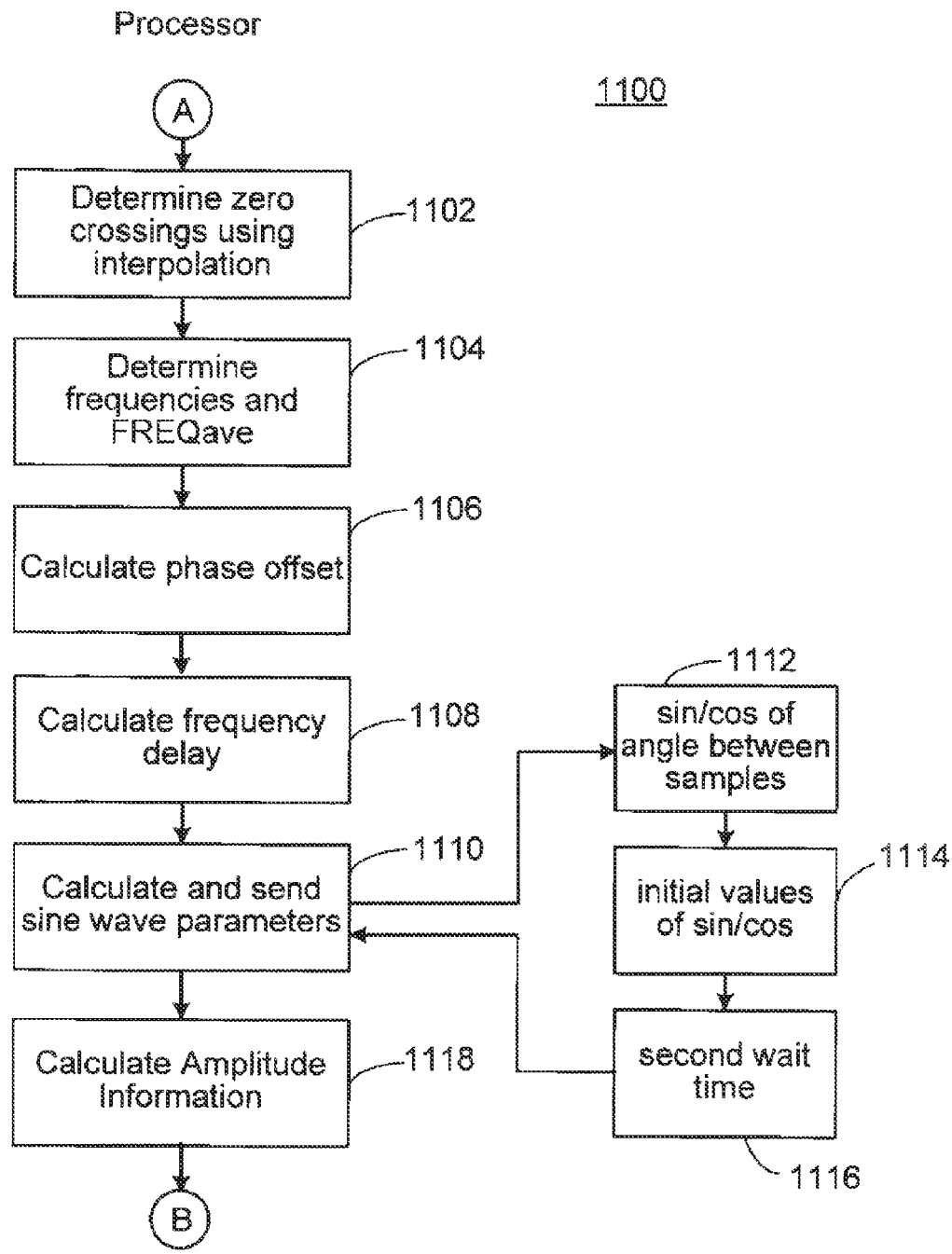
FIG. 11 is a flowchart illustrating further operations of a digital flowmeter.

FIGS. 10A, 10B, and 11 are flowcharts 1000A, 1000B, and 1100, respectively, summarizing operations associated with the timing diagrams of FIGS. 8 and 9. More specifically, the flowcharts 1000A, 1000B, and 1100 illustrate the division of tasks between the FPGA 310 and the processor 315, as discussed above. Specific examples of computational techniques for implementing these tasks are discussed below with respect to FIGS. 12-14, as well as with reference back to FIGS. 8 and 9.

In the flowchart 1000A of FIG. 10A, representing a first set of actions taken by the FPGA 310, the FPGA 310 begins by inputting sensor signals from the output of ADC 415 (1002).

The filter 450 is then applied to the sensor signals (1004). The FPGA 310 then calculates the weighted sum of the sensor signals (1006), detects a zero crossing of the weighted sum (1008), and forwards the filtered signals to the processor 315 (1010).

In the flowchart 1100 of FIG. 11, representing a set of actions taken by the processor 315, the processor 315 determines at least two zero crossings from previous wave cycles, using, for example, interpolation (1102), and uses this information to accurately calculate frequencies of the sensor signals (as well as the average frequency $freq_{ave}$ of the sensor signals) (1104). The processor 315 then calculates the phase offset $\Pi_0$ (1106), and then calculates a filter delay (1108).

Subsequently, using the just-determined frequency and phase offset information (i.e., the (non-zero) phase value assigned to a first sample of each new cycle generated by the drive output (see FIG. 12), and not the phase difference between two sensor signals (which is attributable to the mass flow of fluid moving through the flowtube being used)), the processor 315 calculates synthesis sine wave parameters (1110). As mentioned above, some of the sine wave parameters calculated may include the sine/cosine of an angled between digital samples taken (1112), initial values of the sine/cosine functions (1114), and the second wait time that the FPGA 310 is to wait before beginning synthesis (1116).

The processor 315 then calculates amplitude information (1118), including an actual amplitude of the sensor signals and a desired gain factor. A gain sign also may be determined (for example, a negative gain may be selected for, for example, amplitude reduction during set point change or in highly-damped fluids, as referred to above), along with an oscillation mode (e.g., Coriolis or driven), sensor balance factors, and drive balance factors (see FIG. 7).

Returning to FIG. 10B, in the flowchart 1000B, the FPGA 310 receives the various calculated parameters from the processor 315 and proceeds to wait the first wait time, until the relevant zero crossing is detected (1012). At this point, the FPGA 310 inputs and applies the synthesis parameters (1014), and proceeds to wait the second wait time (1016). Once the second wait time has passed, the FPGA 310 begins to synthesize the desired sine wave (1018).

Subsequently, the amplitude of the synthesized wave is adjusted as needed (e.g., a drive gain factor is applied to the sine wave) (1020), and the sine wave is forwarded to the DAC 430 inputs, to be output therefrom as the drive signal (1022).

Example operations of the processor 315, as just explained above with respect to FIG. 11 and flowchart 1100, are discussed below with respect to FIGS. 12-14.

Specifically, FIG. 12 is an illustration of a zero-crossing of a signal output by the filter 450 (e.g., signal 804 or signal 906 of FIGS. 8 and 9, respectively), FIG. 12 illustrates the need for the determination of zero-crossing(s) using interpolation (1102 of FIG. 11). As already explained above with respect to FIGS. 8 and 9, a signal 1202 is input through the ADC 415 and the filter 450, and experiences an associated delay 1204 before being output as a signal 1206.

In the signal 1206, there may be a difference between an actual zero-crossing 1208 and a closest sample 1210, resulting in an offset 1212. In order to determine the zero-crossing 1208, an interpolation process, such as a quadratic or a linear interpolation process, may be used. For example, the processor 315 may fetch a full cycle of the filtered sensor signal(s) 1206, along with a number of samples from each end of the cycle, and uses these parameters in the interpolation process to determine the zero-crossing 1206.

FIG. 13 is an illustration of a sine wave 1302 illustrating synthesis parameters. In FIG. 13, a full cycle of the sine wave 1302 is illustrated, along with samples 1304 of the sine wave 1302. As illustrated in FIG. 13, then, a phase offset parameter $\Pi_0$ is defined as a difference between an actual start (zero-crossing) of the signal 1302 and a first sample 1304a. Meanwhile, the angle δ is defined as the phase between, for example, a second sample 1304b and a third sample 1304c, so that (as mentioned above) $\delta=2\pi \text{freq}_{avg}/F_s$.

Using these parameters, the FPGA 310 may recursively generate (synthesize) a desired sine wave (1018 of FIG. 10B) using the following recurrence formulae (Equations (1) and (2)) from the trigonometry of the sum of two angles:

$$\sin(\theta+\delta)=\sin(\theta)\cos(\delta)+\cos(\theta)\sin(\delta) \quad \text{Eq. (1)}$$

$$\cos(\theta+\delta)=\cos(\theta)\cos(\delta)-\sin(\theta)\sin(\delta) \quad \text{Eq. (2)}$$

Thus, in Equations (1) and (2) and using the parameters of FIG. 13, $\theta=\theta_0+n\delta$, for $n=0, 1, 2, \ldots$. Parameter δ conveys the frequency of the synthesized wave, which is made equal to the sensor average frequency $\text{freq}_{avg}$. In practice, the initial value $\theta_0$ will typically be near zero, since θ and δ are updated at zero crossings.

The variables sin(δ) and cos(δ) are parameters that may be calculated by the processor 315 in every measurement cycle, and passed onto the FPGA 310 on a 24-bit format. Typical values of δ are very small, so that sin(δ)≈0 and cos(δ)≈1. In one implementation, cos(δ) is sent to the FPGA 310 as its difference with 1.0 (i.e., [1−cos(δ)]). Also, the parameters sin(δ) and [1−cos(δ)] may be scaled such that any of the most significant bits that are known to be zero are discarded, so that only the first 24 values capable of taking non-zero values are sent to the FPGA 310.

In this case, Equations (1) and (2) can be re-written as Equations (3) and (4), using the parameter [1−cos(δ)]:

$$\sin(\theta_{j+1})=\sin(\theta_j)+\Delta\sin \quad \text{Eq. (3)}$$

$$\cos(\theta_{j+1})=\cos(\theta_j)+\Delta\cos \quad \text{Eq. (4)}$$

In Equations (3) and (4), $\theta_j=j\delta+\theta_0$ and the terms Δ sin and Δ cos can be determined according to Equations (5) and (6):

$$\Delta\sin=\sin(\theta_{j+1})-\sin(\theta_j)$$

$$\Rightarrow \Delta\sin=-\sin(\theta_j)+\sin(\theta_j)\cos(\delta)+\cos(\theta_j)\sin(\delta)$$

$$\Rightarrow \Delta\sin=-\sin(\theta_j)[1-\cos(\delta)]+\cos(\theta_j)\sin(\delta) \quad \text{Eq. (5)}$$

$$\Delta\cos=\cos(\theta_{j+1})-\cos(\theta_j)$$

$$\Rightarrow \Delta\cos=-\cos(\theta_j)+\cos(\theta_j)\cos(\delta)-\sin(\theta_j)\sin(\delta)$$

$$\Rightarrow \Delta\cos=-\cos(\theta_j)[1-\cos(\delta)]-\sin(\theta_j)\sin(\delta) \quad \text{Eq. (6)}$$

The parameter $\Pi_0$ may be sent by the processor 315 to the FPGA 310 by providing initial values $\sin(\theta_0)$ and $\cos(\theta_0)$, with $\sin(\theta_0)$ being the first output value of the synthesized cycle wave. These may be passed in, for example, a 32-bit format, and used to determine the phase offset of the driver signals.

The phase offset $\Pi_0$ ideally should match the sensor signals, in order to get an oscillation as close as possible to the resonance frequency. Even for a fixed drive frequency, however, the value of $\Pi_0$ may vary from cycle to cycle, because the CODEC sample rate is typically not an exact multiple of the drive frequency. Specifically, the value of $\theta_0$ varies between 0 and δ according to a beating effect between the drive and the CODEC frequencies. For example, for a CODEC frequency of 40 kHz and a drive frequency of 81.2 Hz, then δ=0.73°. Assuming a value of $\theta_0$ of zero on cycle 1, Table 1 shows the values of $\theta_0$ on subsequent cycles.

TABLE 1

| cycle index i | sample index k | time t = kT$_s$ (s) | phase offset $\theta_0$ (degrees) |
|---|---|---|---|
| 1 | 1 | 0.0000 | 0.0000 |
| 2 | 494 | 0.0123 | 0.2844 |
| 3 | 987 | 0.0246 | 0.5688 |
| 4 | 1479 | 0.0369 | 0.1224 |
| 5 | 1972 | 0.0493 | 0.4068 |
| 6 | 2465 | 0.0616 | 0.6912 |
| 7 | 2957 | 0.0739 | 0.2448 |

The difference in phase offset between two consecutive cycles may be more significant in higher-frequency flowtubes. For example, using the same CODEC frequency with a 650 Hz drive frequency, δ is as high as 5.85°, as shown in Table 2:

TABLE 2

| cycle index i | sample index k | time t = kT$_s$ (s) | phase offset $\theta_0$ (degrees) |
|---|---|---|---|
| 1 | 1 | 0.0000 | 0.0000 |
| 2 | 63 | 0.0015 | 2.7002 |
| 3 | 125 | 0.0031 | 5.3994 |
| 4 | 186 | 0.0046 | 2.2506 |
| 5 | 248 | 0.0062 | 4.9491 |
| 6 | 309 | 0.0077 | 1.8008 |
| 7 | 371 | 0.0092 | 4.4990 |

Thus, for a correct value of $\Pi_0$, it is important to know for which output cycle the value is being generated. As discussed below, this can prove difficult for high-frequency flowtubes.

From Tables 1 and 2 and the preceding discussion, it should be understood that a potential shortcoming related to the use of the positive feedback mode is that, in this mode, only phase values actually sampled and stored in the buffer 425 may be generated. As a result, a phase offset between the sensor signal(s) and the drive signal(s) may be as high as one sample (i.e., δ). As just illustrated, this phase offset is potentially problematic, particularly in a high-frequency flowtube environment. In contrast, the digital synthesis mode is capable of outputting virtually any desired phase value, as needed. Thus, in this mode of operation, substantially exact phase matching may be virtually assured.

Another parameter calculated during execution of the flowchart 1100 is the filter delay parameter (1108). As mentioned above, the filter 450 imparts a delay on a filtered signal that is related to a non-linear function of a frequency of the signal at an input of the filter 450. Therefore, as also discussed above, the processor 315 typically determines an actual frequency of the input signal, and feeds this value into the non-linear function to thereby calculate the filter delay (hereafter, ψ(f)).

This delay ψ(f), usually represented in angle units (either degrees or radians), can be analytically obtained from the filter coefficients. Using the sampling frequency Fs. ψ(f) is converted into a non-integer number of samples. This delay-in-samples may then be modeled by, for example, a $6^{th}$-order polynomial (discussed in more detail below), in order to speed its calculation up in the processor.

Figure 14A:
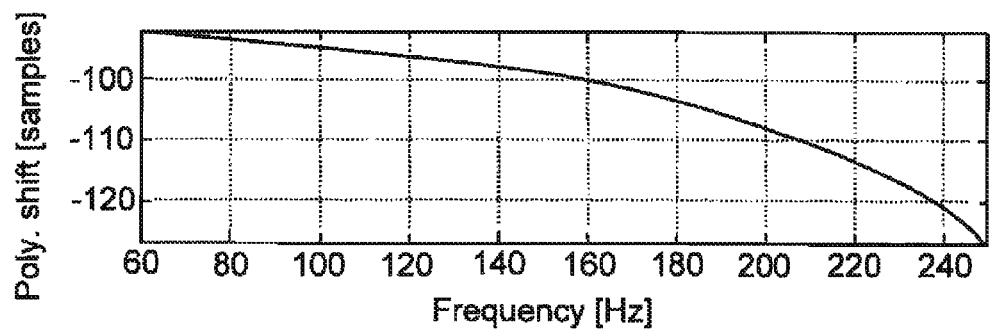
FIGS. 14A, 14B, and 14C are graphs showing filter characteristics of a filter used in an operation of a digital flowmeter.
Figure 14B:
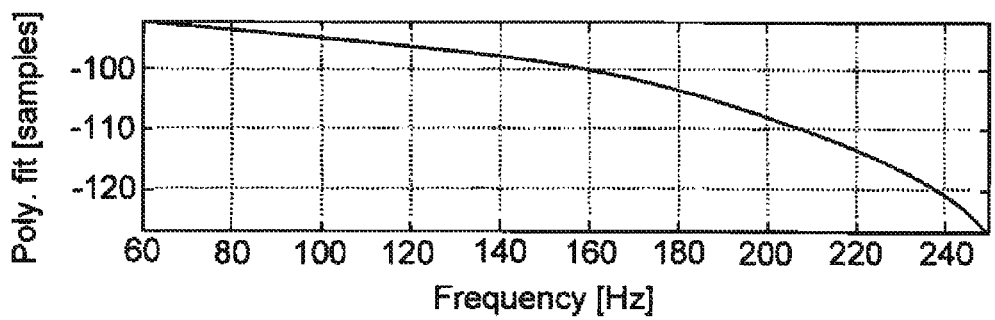
Figure 14C:
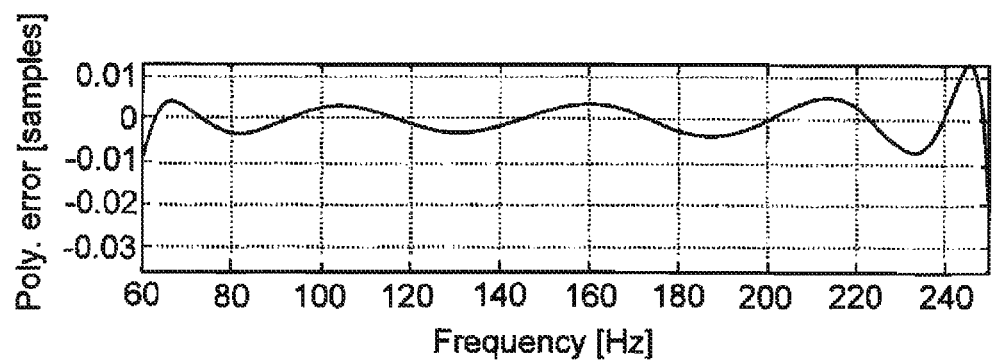

FIGS. 14A, 14B, and 14C are graphs showing filter characteristics. FIGS. 14A-14C are illustrated in samples, rather than in degrees. FIG. 14A illustrates phase delay against frequency for a range of frequencies that might be used with a low-frequency flowtube. FIG. 14B illustrates a polynomial fit for the graph of FIG. 14A, and FIG. 14C shows residuals of the polynomial fit (where the residuals do not exceed the value of ±0.01 samples).

In one implementation, the filter 450 discussed above may be a $6^{th}$ order elliptical floating-point or fixed point filter (an "infinite impulse response" or "IIR" filter) implemented on the FPGA 310. Such a filter may be operable to suppress unwanted (high) frequency components, such as higher resonant modes, from the sensor signal(s) (and, during a positive feedback mode, thereby ensuring that such unwanted frequencies are not fed back into the drive signal(s)).

For example, such a filter may be implemented having a cut-off frequency slightly higher than the resonance frequency of the flowtube 215, and used to filter an output of the driver(s) 210. Additionally, one or more IIR filters or "Finite Response Filters" ("FIRs") can be implemented on the processor to further improve measurement performance.

An added benefit of using an elliptical filter as the filter 450 on the FPGA 310 is that a sawtooth waveform passing through such a filter becomes nearly sinusoidal, which may be useful for forcing start-up of the flowtube 215 (start-up operations are discussed in more detail below).

In considering the use of a filter as described herein, it should be understood that such a filter is essentially a low-pass or band-pass filter having very stringent specifications. That is, in order to perform its functionality, the filter must have a very sharp filter cutoff at a very low frequency. For example, the bent flowtube 102 may have a maximum resonant frequency of about 100 Hz, where key higher harmonics and undesired resonant modes of the flowtube 215 to be suppressed are in the range of 150-1500 Hz, with a typical sampling rate of 40 kHz.

As mentioned above, analog flowmeters typically impart marginal, if any, delay to the drive signal with respect to the sensor signal, and therefore may not require any phase compensation. However, filters such as those described herein cannot effectively be added to such analog flowmeters, since the phase delay introduced by the filters cannot easily be compensated for. Moreover, the use of such filters would be impractical in analog designs for the simple reason that it would be difficult or impossible for the filters to provide the required sharp cutoff in that context (e.g., elliptical filters cannot be implemented in analog designs).

In contrast, the implementations disclosed herein are capable of compensating for these (and other) phase delays, so that an elliptical filter can be effectively and efficiently implemented by simply including its functionality within the FPGA 310, as described above.

A transfer function for an elliptical filter that may be implemented as the filter 450 in the FPGA 310, where the filter 450 is implemented in second-order-sections, is expressed in Equation (7) for an i-th filter section:

$$H_i = \frac{Y_i(z)}{X_i(z)} = \frac{\sum_{j=0}^{2} b_{ij} z^{-j}}{\sum_{j=0}^{2} a_{ij} z^{-j}} \quad \text{Eq. (7)}$$

A difference equation for such a filter is expressed in Equation (8):

$$a_{i0} y_i(k) + a_{i1} y_i(k-1) + a_{i2} y_i(k-2) = b_{i0} x_i(k) + b_{i1} x_i(k-1) + b_{i2} x_i(k-2) \quad \text{Eq. (8)}$$

where Eq. (8) can be solved for $y_i$, as shown in Equation (9):

Thus, for example, a $6^{th}$ order elliptical filter may be implemented using three consecutive $2^{nd}$ order sections. In this case, for a particular flowtube type (e.g., bent or straight) and sampling frequency, the coefficients $a_0$, $a_1$, $a_2$, $b_0$, $b_1$, and $b_2$ (for each of the three sections) may be determined by considering a full range of operating frequencies for the drive signal(s) (i.e., from a maximum frequency, corresponding to an empty flowtube, to a frequency corresponding to the flowtube when full of a fluid with the highest density specified for the flowtube), in conjunction with desired cut-off frequencies for the particular application. Each filtering stage may introduce additional delay/phase offset that may, in turn, be compensated for using, for example, one or more of the above-described techniques. When using the above and/or related filtering techniques, the amplitude of high-frequency components in a signal may be reduced by a factor of, for example, 1000 or more.

More generally regarding filtering processes, it should be understood that there are several types of filtering that can be implemented at various stages of the above-described implementations. Examples of such filtering include: analog filtering of sensor data prior to its reading by the CODEC 305, fixed-point filtering of measurement data within the FPGA 310, floating point filtering of measurement data within the processor 315, fixed-point filtering of the synthesized drive signal within the FPGA 310, and analog filtering of the drive waveform on its output.

Of these options, the latter three are considered here in more detail. First, floating-point filtering of measurement within the processor 315 requires that the processor receive raw data, and apply whatever processing is deemed most appropriate (which may change with circumstances). Any pre-filtering of the raw data is fixed and cannot readily be modified. Unwanted harmonics can be suppressed during waveform synthesis using this technique.

Fixed-point filtering of the synthesized drive signal within the FPGA 310 can be used, for example, during positive feedback, in order to suppress unwanted harmonics in the sensor data from being passed through to the drivers. Since the processor 315 is not directly involved in waveform synthesis, it will not typically perform this particular filtering function.

Finally, analog filtering of the drive signal post-CODEC may be used to smooth out high-frequency noise introduced by the codec and subsequent circuitry.

As a final point regarding the flowchart 1100, issues regarding the calculation of the second wait time (1116) are discussed in more detail below.

As already mentioned, it takes the processor 315 some finite amount of time to analyze the filtered sensor signal wave (e.g., time 814 in FIG. 8 and time 910 in FIG. 9). As a result, by the time that the calculation of the sine wave synthesis parameters is done, the sensor signal has gone ahead a number of samples, and, as shown in FIG. 9, may possibly advance more than a whole cycle (depending on, for example, the flowtube frequency and the processor computational load, such as an external communication request).

Also, the CODEC DAC 430 has a delay of, for example, 30 samples between the value sent by the FPGA 310 to the CODEC DAC 430 input and the signal appearing at the DAC 430 output, which has to be taken into consideration. Therefore, as illustrated in FIGS. 8 and 9, a number of cycles between the start of the sensor wave under analysis and the $$y_i(k) = \frac{[b_{i0} x_i(k) + b_{i1} x_i(k-1) + b_{i2} x_i(k-2) - a_{i0} y_i(k) + a_{i1} y_i(k-1) + a_{i2} y_i(k-2)]}{(a_{i0})} \quad \text{Eq. (9)}$$

start of the synthesized wave at the CODEC DAC 430 output should be calculated, in order to adjust an initial value of the synthesized wave.

One way of seeing how far behind "real time" the processor 315 has fallen is to look at the circular buffer 425 backlog. This backlog represents a count of how many ADC samples have been received by the FPGA 310 and are waiting to be sent to the processor 315. By looking at the data backlog of the circular buffer 425 and taking the average frequency of the cycle under analysis as the estimated frequency of the next wave(s), it is possible to infer which cycles to target in the calculation of the start of the cycle, as is shown in the example code section below, Code Section 1:

Code Section 1

```
period = 1.0 / avg_freq;
samples_waiting_in_fpga = get_fpga_bufsize( );
num_cycles = (int) (floor(samples_waiting_in_fpga / period)) + 2;
samples_per_cycle = sample_freq / avg_freq;
predict_start_cycle = start_cycle_offset + num_cycles * samples_per_cycle;
predict_start_cycle_int = floor(predict_start_cycle);
predict_start_cycle_offset = predict_start_cycle - predict_start_cycle_int;
```

FIGS. 8 and 9 show the timing in the sequence of steps of Code Section 1, starting from cycle i in the sensor signal(s) to the generation of a sine wave at an output of the DAC 430, using parameters calculated from sensor cycle i.

In FIG. 8, the frequency of oscillation is slow compared to the time that the processor 315 takes to analyze a sensor wave, so that there is less than a cycle's worth of samples waiting in the buffer 425 at the time when the processor 315 finishes the analysis of the previous wave (e.g., determines its frequency and related filter delay). In such a case, the quantity "num_cycles" would be typically zero+2. This is consistent with the above explanation of FIG. 8, in which the FPGA 310 waits a time equal to the period of the sensor wave i+2 (assuming that this period hasn't change since cycle i), minus the total delay in the path, i.e. ADC+filter delay 806 and DAC delay 828, to start the synthesis of a wave that will attempt to match sensor cycle i+3.

More generally, a total "wait" count (i.e., the count for the second wait time 820 of FIG. 8 or 916 of FIG. 9) may be sent by the processor 315 to the FPGA 310 as another synthesis parameter (1116). This wait count carries the information of the filter delay at sensor signal frequency, and may be determined using, for example, Code Section 2:

Code Section 2

```
filter_delay = get_filter_delay_in_samples (avg_freq);
wait_count = samples_per_cycle - codec_delay + filter_delay;
while (wait_count < 0) {
    wait_count += samples_per_cycle;
}
while (wait_count > samples_per_cycle) {
    wait_count -= samples_per_cycle;
}
```

If the flow-tube frequency is high relative to a calculation time of the processor 315, then more than a cycle could have accumulated before the processor finishes the analysis of one wave. In this case, the total delay is greater than the cycle length, so an entire cycle may be added to the wait count of Code Section 2, as shown in FIG. 9.

In selecting the phase of the (synthesized) drive signals relative to the sensor signal(s), several options exist in the low-frequency flowtube environment. For example, the phase of a driver signal, d1 or d2, can match the phase of one of the following: the weighted sum of filtered sensor signals (wfs), the filtered corresponding sensor signal, or one of the filtered sensor signals.

In the first option of matching weighted sum of filtered sensor signals, both drive outputs are equal and match the phase of the weighted filter sum signal, which, under normal operation, lies between the two sensor signals. The search for the start of the cycle offset and the zero-crossing detection (explained above) are applied to the weighted filter sum signal, rather than to the filtered, individual sensor signals. Another way to find a start of the cycle offset for the weighted filter sum is to calculate the average of the start of the cycle offsets for the individual, filtered sensor signals. In this option, the total wait count (e.g., the second wait time 820 of FIG. 8) is the same for both drivers.

In the second option, a first drive signal is matched with a first sensor signal, while the second drive signal is matched with the second sensor signal. This option has the same $\delta$ parameter, but different $\theta_0$ for each of the two drivers. The start of the cycle is calculated for each sensor wave, and used to calculate the initial values of sine and cosine of each drive signal. The total wait count may be different for each sensor as well. As the synchronization drive-sensor is made with the weighted filtered sum signal, the phase difference between the two sensor signals indicates the expected location of the zero-crossings for each sensor signal. Such a phase difference may be based on cycle i analysis, where it is assumed that there is no significant change in the phase(s) by the time that the drive signals reach the DAC 430 outputs.

In the third option, both of the drive signals are matched with only one of the two sensor signals. In this option, as in the first option, both drive signals are equal, and match the phase of one sensor signal (i.e., the matched sensor signal, instead of the wfs). However, a start of the cycle offset for only the relevant (i.e., matched) sensor signal is predicted, and the same watt count is used for both drive signals.

Code section 3 shows an example calculation of the wait count parameter for each option:

Code Section 3

```
phase_diff_in_samples = phase_diff * samples_per_cycle / 360.0;
switch(drive_phase_mode) {
    case 0:    /* driver outputs in phase with wfs */
        // send the same value to driver output 2
        wait_count1 = wait_count2 = wait_count;
        break;
    case 1:    /* driver outputs in phase with s1 */
        // send the same value to driver output 2
        wait_count 1 = wait_count - (phase_diff_in_samples / 2.0);
        wait_count 2 = wait_count 1;
        break;
    case 2:    /* driver outputs in phase with each sensor */
    default:
        wait_count 2 = wait_count + (phase_diff_in_samples / 2.0);
        wait_count 1 = wait_count - (phase_diff_in_samples / 2.0);
        break;
}
```

Parameter $\theta_0$ is calculated from a start of cycle offset, as shown in Code Section 4:

---
Code Section 4
---

```
/* phase offset */
    predict_start_cycle1 = start_cycle_offset1 +
num_cycles*samples_per_cycle;
    predict_start_cycle_int1 = floor( predict_start_cycle1);
    pred_sco1 = predict_start_cycle1 - predict_start_cycle_int1;
    predict_start_cycle2 = start_cycle_offset2 +
num_cycles*samples_per_cycle;
    predict_start_cycle_int2 = floor( predict_start_cycle2);
    pred_sco2 = predict_start_cycle2 - predict_start_cycle_int2;
    switch (drive_phase_mode) {
        case 0:    /* driver outputs in phase with wsum */
            predic_soc    = ( predic_soc1 + predic_soc2)/ 2.0;
            theta_0 = (1 - predic_soc) * delta;
            break;
        case 1:    /* driver outputs in phase with sv1 */
        case 2:    /* driver outputs in phase with each sensor */
        default:
            theta_0 = (1 - predic_soc1) * delta;
            break;
    }
```
---

As already mentioned, the above options for selecting a phase of the driver signal(s) with respect to the sensor signals may only be applicable in a low-frequency flowtube environment, such as might be used with the bent flowtube 102.

In a high-frequency flowtube environment, such as might be seen in conjunction with the straight flowtube 106, the flowtube can resonate at frequencies ranging from approximately 200 to 1000 Hz. Whereas a sensor cycle in a low-frequency flowtube may be about 500 samples long, it takes less than 100 values to sample a cycle in a high-frequency flowtube (using the same sampling frequency of, for example, 40 kHz). Thus, with a filter delay of, for example, 32 samples and a CODEC delay of, for example, 61 samples, by the time the FPGA 310 detects a zero-crossing at the wfs signal and obtains the synthesis parameters from the processor, one or more cycles might have already occurred (as discussed above and illustrated in FIG. 9). Moreover, as discussed above with respect to Table 2, it may be important (yet problematic) to know which output cycle corresponds to a particular, correct value of the parameter $\Pi_0$.

Further, as referred to above, an increase in the computational load of the processor 315, e.g., an external communication request, might cause a longer delay in the frequency/filter delay calculation. Such a delay may lead to inaccuracies in determining which cycle is actually being generated in the flowtube in real time. Also, the FPGA 310 continues generating cycles of the drive signal while the processor 315 is busy, even when no new parameters have been sent to the FPGA 310.

A way to address this issue of maintaining accuracy in tracking cycles of the drive signal is to keep a cycle counter at the output of the digital filter 450 in the FPGA 310. By allowing access to this cycle count, the FPGA 310 tells the processor 315 how many cycles have passed from the moment the processor 315 fetched a cycle i for its analysis, until the moment the FPGA 310 calculates the actual synthesis parameters. To prevent further tracking inaccuracies, the processor 315 may provide to the FPGA 310 two or more sets of parameters, corresponding to two or more cycles ahead.

Such a cycle counter as a tracking mechanism may be kept for both types of flowtubes 102 and 104. Code Section 5 (which may be applied just after the calculation of $freq_{ave}$) is a modified version of Code Section 4 that includes the cycle counting/tracking functionality.

---
Code Section 5
---

```
    input_zero_crossing_counter =
get_fpga_zero_crossings_count( );
    period = 1.0 / avg_freq;
    samples_waiting_in_fpga = get_fpga_bufsize( );
    num_cycles_in_buffer = (int) (floor(samples_waiting_in_fpga /
period));
    /* zero-crossing index of wave under analysis in processor */
    cycle_index = input_zero_crossing_counter -
num_cycles_in_buffer;
    num_cycles = get_fpga_zero_crossings_count( ) - cycle_index;
    cycle_index += num_cycles;
```
--- where the last two lines of Code Section 5 may be applied just before a calculation of the synthesis parameters.

In addition, in a high-frequency flowtube, the processor 315 may send the quantity "cycle_index" to the FPGA 310, along with the synthesis parameters for that cycle and the following two cycles. The FPGA 310 may thus compare this cycle index with its current cycle index, and take the set of synthesis parameters that correspond to the next cycle. For example, if the processor 315 has just finished calculations for "cycle 20," and sends synthesis parameters for "cycles 25, 26, and 27." Taking into account a processor delay, the FPGA may be ready to begin synthesis of "cycle 26" at the next zero-crossing, and so would use synthesis parameters corresponding to this cycle (received from the processor 315). If more than 3 cycles have elapsed, then the FPGA 310 may take the set corresponding to cycle_index, as it could have taken any other of the two. In another implementation, a set for a phase offset corresponding to half a sample may be sent to the FPGA 310, in order to reduce the error in that case.

Code Section 6 illustrates an example for calculating the synthesis parameters for a high-frequency tube. Notice that, as already mentioned, due to its high resonance frequency, only one option is made available for matching the sensor phase, i.e., matching the phase of the weighted sum of filtered sensor signals.

---
Code Section 6
---

```
    case HI_FREQ_FLOWTUBE:
    /* phase offset */
    predict_start_cycle1 = start_cycle_offset1;
    predict_start_cycle2 = start_cycle_offset2;
        for (i=0; <NUM_SOC_OFFSET; i++) {
            predic_start_cycle1 += num_cycles *
samples_per_cycle1;
            predict_start_cycle_int1 = floor( predict_start_cycle1);
            pred_sco1 = predict_start_cycle1 -
    predict_start_cycle_int1;
            predict_start_cycle2 += num_cycles *
samples_per_cycle2;
            predict_start_cycle_int2 = floor( predict_start_cycle2);
            pred_sco2 = predict_start_cycle2 -
    predict_start_cycle_int2;
            predic_soc = ( predic_soc1 + predic_soc2)/ 2.0;
            theta_0[ i] = (1 - predic_soc) * delta;
            num_cycles++;
        }
        break;
    }
```
---

The above discussion has provided techniques for compensating for digital delay in a digital flowmeter, where these techniques apply corrections/adjustments to a (synthesized) drive signal based on a corresponding mathematical model of the characteristics of the flowmeter. The examples of these techniques described above do not include verification of the results of the delay compensation; in other words, the techniques may be thought of as "open-loop" techniques.

A "closed-loop" approach, however, is additionally and/or alternatively possible. Such an approach might include, for example, taking additional readings of the drive signal (e.g., current and/or voltage), and then directly calculating any phase difference between the drive signal and the sensor signal. Thus, adjustments can be made to a phase offset of the drive signal output to ensure that it matches the phase of the sensor signal input.

Figure 15:
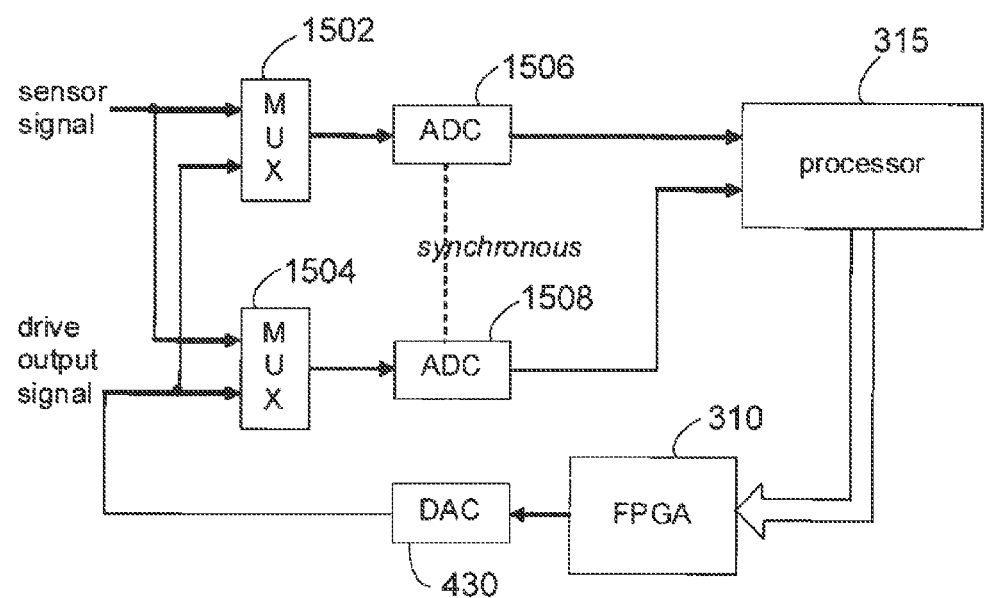
FIG. 15 is a block diagram of a closed-loop system for compensating digital delay in a flowmeter.

FIG. 15 is a block diagram of a closed-loop system for compensating digital delay in a flowmeter. In FIG. 15, a first multiplexer 1502 and a second multiplexer 1504 each input the sensor signal(s) and the driver signal(s) (note that, in FIG. 15, only one sensor and driver signal is shown as being input into each multiplexer 1502 and 1504, however, it should be understood that FIG. 15 might represent either a one-driver or a two-driver system). In this way, any phase difference between the drive output signal(s) and the sensor signal(s) can be obtained (much as the sensor signals are analyzed in the above discussion), and this difference can be used in a self-correcting feedback loop.

Calibration can be made by using the multiplexers 1502 and 1504 to place the same signals) at the input of the ADCs 1506 and 1508. In FIG. 15, the ADCs 1506 and 1508 may represent additional ADCs beyond those illustrated in, for example, FIG. 4. Alternatively, functionality of the ADCs 1506 and 1508 may be implemented using the existing ADCs 415, along with the appropriate additional connections.

Also in FIG. 15, ADCs 1506 and 1508 are assumed to operate synchronously. That is, the multiplexers 1502 and 1504 are assumed to output their respective signals into their respective ADC 1506 or 1508 at a simultaneous point in the cycles of the signals. Should any delays (i.e., loss of synchronicity between the ADCs 1.506 and 1508) be present in practical implementations, such delays may be detected during a calibration process (based on a common, selected signal) by calculating the phase difference between the outputs of the ADCs 1506 and 1508, and subsequently corrected when the drive output signal is measured.

The processor 315 may receive the sensor information in various ways. For example, the ADC 1506 and the ADC 1508 may represent ADC(s) 445 in FIG. 4, and may thus serve to feed back information based on the drive current imparted to the driver(s) 210. As another example, the ADC 1506 and the ADC 1508 may represent ADC(s) 447 in FIG. 4, and may thus serve to feed back information based on the drive voltage imparted to the driver(s) 210.

In one implementation, the closed-loop technique(s) of FIG. 15 may be used as an alternative to the open-loop techniques described above. For example, the processor 315 may send the synthesis parameters to the FPGA 310, based on some estimation of the delay between the sensor signal at the ADC input and the drive signal at the DAC output. Once an entire cycle has been output, the processor 315 may collect one cycle of each (i.e., sensor and drive output signals), and measure their phase difference $\phi_{ds}$. This phase difference may be subtracted or added to the delay, to thereby reduce the delay in subsequent cycles. This process may run continuously.

In FIG. 15, it should be understood that, just as in FIGS. 8 and 9, the FPGA 310 will typically take into account a delay associated with the DAC 430. That is, the FPGA 310 will typically anticipate the DAC delay, calculate a phase associated with a cycle one, two, or more cycles ahead of the measured cycle(s), and output its synthesized signal accordingly. In this way, when the synthesized signal is output from the DAC 430, it will be in phase with the sensor signals, as desired.

In another implementation, the closed-loop technique may be used to supplement or improve the open-loop techniques described above.

The above description has provided techniques for compensating for digital delays that are present in flowmeters having digital components. Different techniques have been described for use in different applications. For example, in the setting of positive feedback, the group delay of the CODEC 305 was compensated for with the use of a circular buffer, as described with respect to FIGS. 5 and 6. As another example, described with respect to FIGS. 7-14, in the setting of sine wave synthesis, both the group delay and the delay associated with the filter 450 are compensated for by using measurements performed on sensor data, to thereby accurately time a beginning of the sine wave synthesis. As a final example, described with respect to FIG. 15, the drive signals are directly measured, and subsequently compared to the sensor signals as part of a closed-loop feedback routine that minimizes a phase difference between the signals.

These techniques may be used on their own, or in combination with one another (or other) techniques. For example, the digital flowmeters of FIGS. 1A and/or 1B could be operated purely in a positive feedback mode, or purely in a sine wave synthesis mode. As another example, the positive feedback mode may be used as a precursor to the sine wave synthesis mode. In one implementation, using the positive feedback mode as a precursor to the sine wave synthesis mode allows rapid and reliable start-up (and operation) of a digital flowmeter. Such a rapid and reliable start-up may be further enhanced through the use of a "random excitation mode" as a precursor to the positive feedback mode, as described in more detail below.

Figure 16:
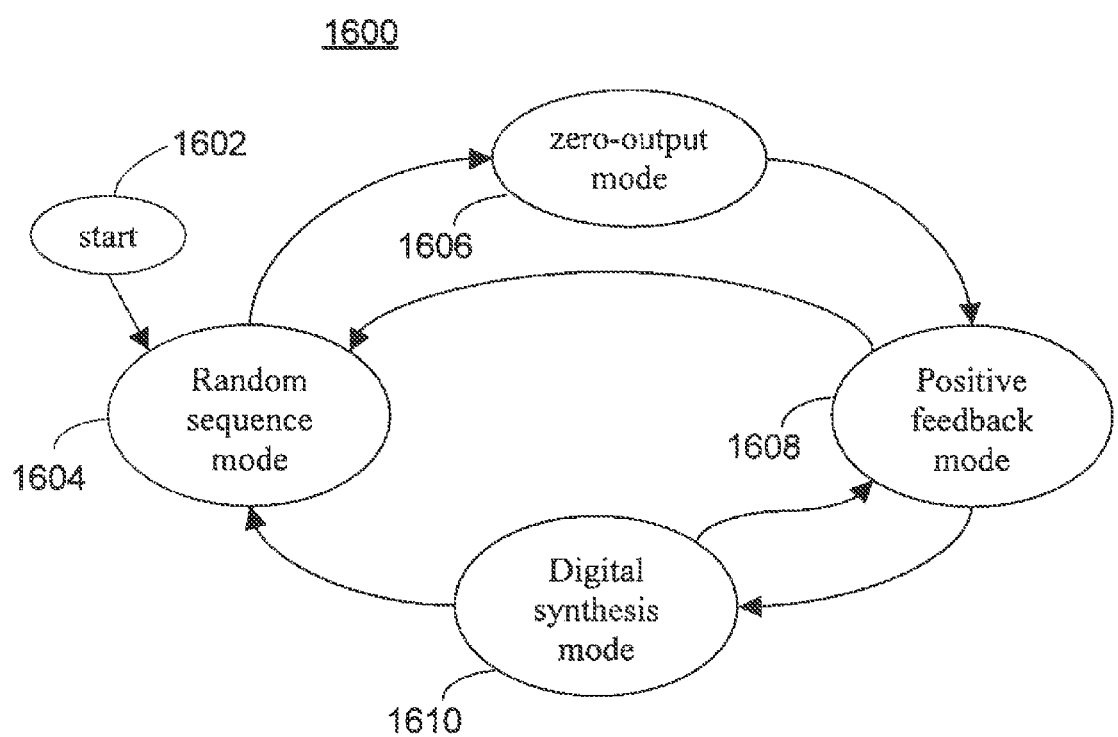
FIG. 16 is a flow diagram illustrating start-up and operational techniques for a digital flowmeter.

FIG. 16 is a flow diagram 1600 illustrating; start-up and operational techniques for a digital flowmeter. In the flow diagram 1600, at a starting point 1602, a state of flowmeter system being used is set to a random sequence mode 1604. In this mode, the flowtube 215 is excited with a wide band of frequencies which are expected to include the (initially unknown) resonant frequency of the flowtube. After a certain number N of samples (as might be taken during a selected time period such as, for example, approximately 1 second, corresponding to a warm-up time of the CODEC 305), the system is switched to a zero-output mode 1606 for a brief period of time (e.g., an M-samples count, where M<<), in order to allow the flowtube 215 to settle at its resonance frequency. The random sequence mode 1602 and the zero-output mode 1606 are described in more detail below with respect to FIG. 17.

Subsequently, the system is switched to a positive feedback mode 1608, which allows the flowtube to quickly reach a stable oscillation, at its resonance frequency and with a high amplitude. The positive feedback mode correlates to the positive feedback mode discussed above with respect to, for example, FIGS. 5 and 6. Further details and examples related to the positive feedback mode 1608, in the context of the flow diagram 1600, are provided below with respect to FIG. 18.

Generally speaking, the random sequence mode 1604 serves to ensure that drive energy is put into the flowtube in the frequency range of interest, and the zero-output mode 1606 allows the flowtube to settle into its resonant frequency. During positive feedback, a pre-selected drive gain is applied to the drive signal, in order to ramp the flowtube 215 up to a desired amplitude set-point. The drive gain has a default value of, for example, ten, which is large enough to cause a rapid rise in oscillation amplitude.

Subsequently, desired waveforms within the drive signals may be identified, and phase-compensated synthesis may thereafter be begun during the digital synthesis mode 1610, so that measurements of the material(s) flowing through the flowtube 215 may be processed within the processor 315. The start-up technique just described may be particularly useful in difficult start-up circumstances, such as, for example, half-full 2-3" tubes.

Although the techniques just described are useful in start-up of the flowtube 215, it should be clear from the flow diagram 1600 of FIG. 16 that similar techniques may be used during an operation of the flowmeter as well. For example, during a time when the flowmeter is in full operation (i.e., synthesis mode) (1610), some difficulty may arise which causes the flowmeter (measurements) to become unstable.

For example, there may be some external disturbance to the system, or there may be some unanticipated object/material that flows through the flowtube. As another example, conditions such as two-phase flow and/or three-phase flow, particularly if initiated quickly or unexpectedly, might degrade or interrupt an operation of the flowmeter.

In such a case, the flowmeter may return to a positive feedback mode 1608, in order to re-stabilize the system (e.g., re-establish the proper frequency, phase and amplitude of the drive signals). Afterwards, the flowmeter may progress back into the digital synthesis mode 1610. Moreover, in a case of a particularly disruptive event, the flowmeter may return to the random sequence mode 1604, and then re-progress through the zero-output mode 1606 to the positive feedback mode 1608, and from there back to the digital synthesis mode 1610.

Similarly, if the flowmeter is operating in a positive feedback mode 1608, either as a result of regressing from the synthesis mode 1610 in the manner just described, or as part of the start-up process that also is described above, then a disturbance or malfunction may cause the flowmeter to return to the random sequence mode 1604. Again in this case, the flowmeter may re-progress through the zero-output mode 1606 to the positive feedback mode 1608, and from there back to the digital synthesis mode 1610.

In this way, a digital flowmeter may attain and/or retain a desired operational state in a fast, reliable manner.

Figure 17:
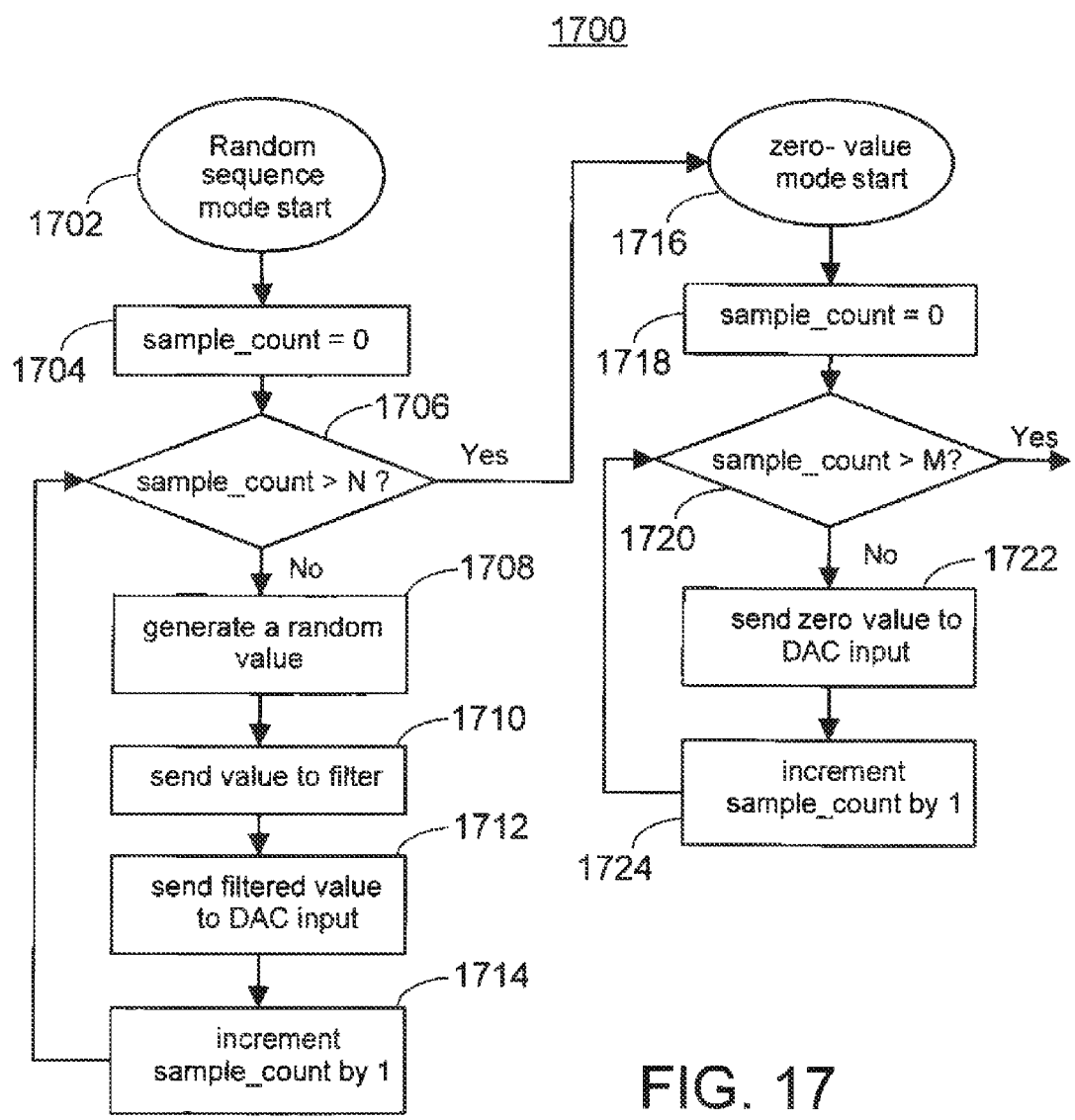
FIG. 17 is a flowchart illustrating the random sequence mode and the zero-output mode of FIG. 16 in more detail.

FIG. 17 is a flowchart 1700 illustrating the random sequence mode 1604 and the zero-output mode 1606 of FIG. 16 in more detail. In FIG. 17, the random sequence mode 1602 starts (1702) with a sample count of zero (1704). Next, the sample count is compared to a value N (1704), where, as mentioned above, a value for N is pre-selected to correspond to a desired duration of the random sequence mode 1602.

If the sample count is less than or equal to the value N, then a random frequency value is generated (1708) and sent to a filter, such as the filter 450 (1710). Subsequently, a result of the filtering process is forwarded to an input of the DAC 430 (1712), and the sample count is incremented by 1 (1714).

When the sample count reaches a value greater than N, then the random sequence mode 1602 is exited, and the zero-value mode 1604 is started (1716). In the zero-value 1604, the sample count is set to zero (1718), and is then compared to a pre-selected value M (1720), which is selected to provide the flowtube enough time to settle into vibration at or near its resonance frequency.

If the sample count is less than or equal to M, then a zero value is sent to an input of the DAC 430 (1722), and the sample count value is incremented by 1 (1724). If the sample count is greater than M, then the positive feedback mode (1606) is started (see FIG. 18).

In short, in generating the random frequency, the implementation of FIG. 17 generates a series of random values, perhaps at a rate corresponding to the sampling rate of the ADC 415, using a random number generator. Then, frequencies in the permitted range of drive frequencies (e.g., 0-100 Hz) are excited by feeding the generated, random sequence through the filter 450, which serves to eliminate substantially all frequency components above the relevant range. The resulting signal is a relatively smooth random sequence, containing all frequencies below the pre-determined cut-off frequency.

In some implementations, rather than removing all frequencies above some pre-determined cut-off frequency, a band-pass filter may be used to remove all frequencies above and below some pre-determined range of frequencies. These implementations might be particularly useful in the context of relatively high-frequency flowtubes (e.g., a flowtube with a resonant frequency of approximately 1000 Hz).

Further, it should be understood that the random sequence mode 1604 is merely an example of possible stimulation signals that may be used to initiate flowtube oscillation in the desired mode of vibration. Other pre-determined (short) signal sequences which are not modified on the basis of the sensor signal analysis also may be used. As with the random sequence mode 1604, analysis of sensor signals instigated by such signal sequences may then be used to estimate, for example, the frequency of oscillation or other flowtube parameter values. This analysis may then trigger a switch to a sustainable mode of flowtube operation, in which the drive signal is modified as needed. Other examples of such drive signals might include square waves, sawtooth waves, or any other sequence designed a-priori to generate flowtube oscillation at start-up in advance of accurate knowledge about the resonant frequency of the flowtube.

Figure 18:
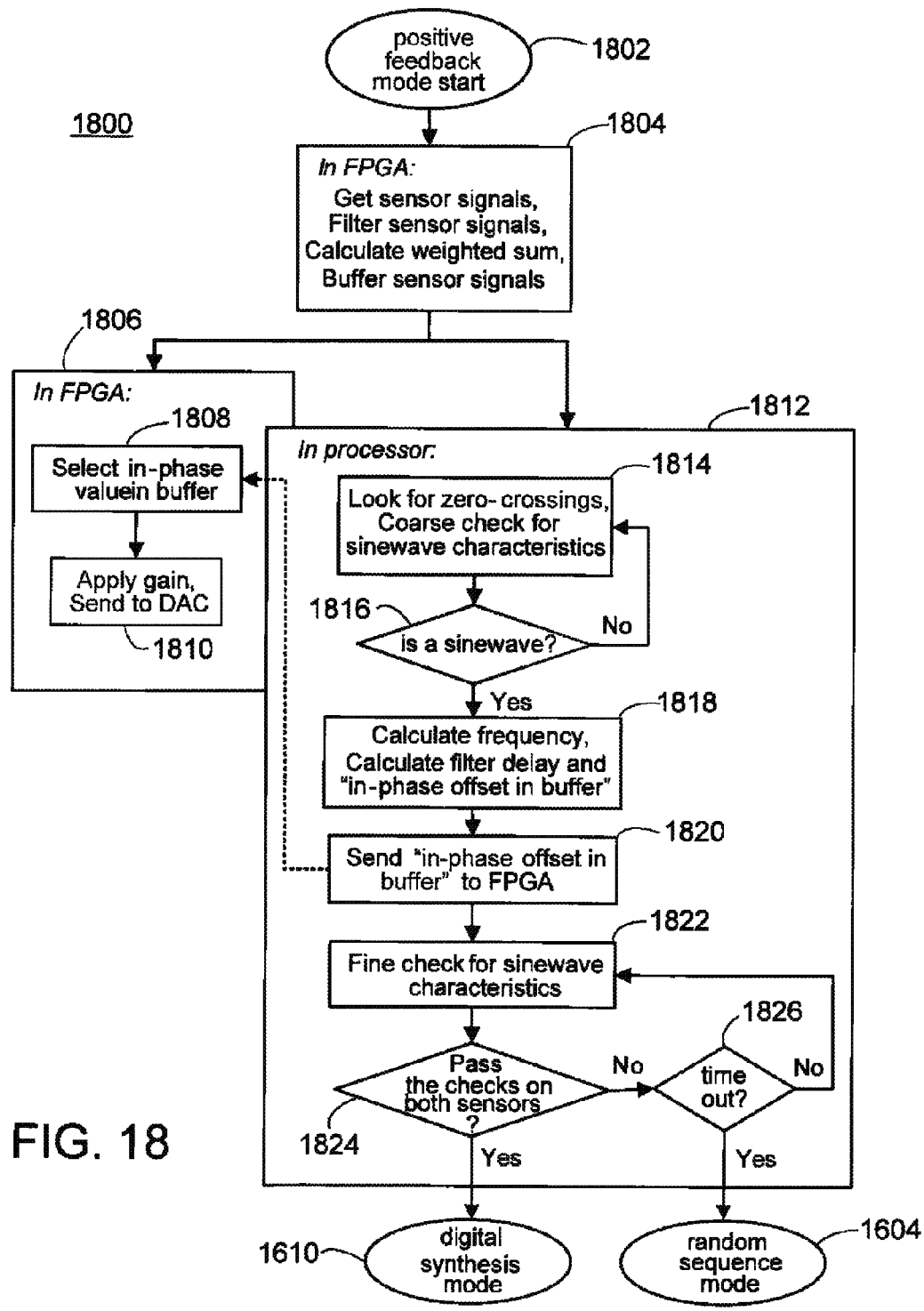
FIG. 18 is a flowchart illustrating the positive feedback mode 1608 of FIG. 16 in more detail.

FIG. 18 is a flowchart 1800 illustrating the positive feedback mode 1608 of FIG. 16 in more detail. At a start of the positive feedback mode 1608 (1802), the FPGA 310 inputs and filters the sensor signals, and calculates the virtual weighted sum for buffering (1804). Then, in a further subset of actions by the FPGA 310 (1806), the FPGA 310 selects a value from the buffer 425 that will account for the CODEC delay (as discussed with respect to FIG. 6) (1808), and then applies the selected gain factor (e.g., ten) to the buffered signal for forwarding to the DAC 430 (1810).

Meanwhile, during a subset of actions taken by the processor 315 (1812), the processor 315 attempts to identify a sinewave-like wave by, for example, running several checks on segments of signals between two consecutive negative-to-positive zero crossings (1814). If a sinewaves detected (1816), then the processor 315 calculates a frequency of the wave and a filter delay associated with that frequency, and translates this information into a corresponding, improved buffer offset (1818).

The improved buffer offset is then sent to the FPGA 310 (1820), where it replaces the previous buffer of set value and allows the drive signal (multiplied by the gain factor) to more closely mimic the phase of the sensor signal. Meanwhile, the processor performs a more detailed analysis of characteristics of the detected sinewave (1822), and checks to see whether the analyzed, detected sinewave is present in both sensor signals (1824) with desired frequency and phase characteristics.

If not, the processor 315 continues to perform these checks for some pre-determined time (1826), after which the processor 315 determines that digital synthesis cannot be satisfactorily entered, and reverts to the random sequence mode (1604). If the sinewave(s) are satisfactorily present in both signals, then the processor 315 forwards the synthesis parameters to the FPGA 310 and the flowmeter enters the digital synthesis mode (1610). The operation of the digital synthesis mode, including examples of operations and interactions of the FPGA 310 and the processor 315, are discussed above with respect to FIGS. 7-13, and particularly with respect to the flowcharts 1000 and 1100 of FIGS. 10 and 11, respectively.

In some implementations, above-describe operations may overlap and/or be duplicated during the various modes of operation. For example, in any or all of the random sequence mode 1604, the zero-output 1606, and the positive feedback mode 1608, the processor 315 may attempt to identify a sinewave-like wave in the manner described above with respect to the positive feedback mode 1608. These and other operations may be enacted in parallel and/or in series with one another, using the FPGA 310/processor 315 architecture described above, or using some other division of labor among selected (e.g., programmed) hardware components.

Also, as explained above, the drive gain during the positive feedback mode 1608 is typically fixed to a high value, so that the amplitude of the oscillation may rise exponentially. In the digital synthesis mode 1610, however, the amplitude may be variable, and may be controlled by a pre-selected algorithm that uses the gain as a controller variable.

FIGS. 19A-19F describe drive signal generation during a start sequence for one implementation of the digital flowmeter as applied to the bent flowtube 102. FIGS. 20A-20F describe drive signal generation during the start sequence of FIGS. 19A-19F in more detail.

The data shown in FIGS. 19A-19F, as well as in FIGS. 20A-20F, are, respectively for each set of figures, raw sensor data (one sensor only), filtered weighted sum of the sensor data, the drive gain, the waveform synthesis mode (i.e., random filtered start-up sequence, positive feedback or pure sine wave synthesis), a flag indicating when there has been an update to the feedback delay parameter, and the actual drive output.

In FIGS. 19A-19F, up until just before 1 second has passed, the drive output is random while the CODEC 305 warms up; that is, the flowmeter is operating in the random sequence mode 1604. As sensor data begins to be collected, again just before 1 second has passed, the zero-output mode 1606 can be seen in FIG. 19F.

Figure 19D:
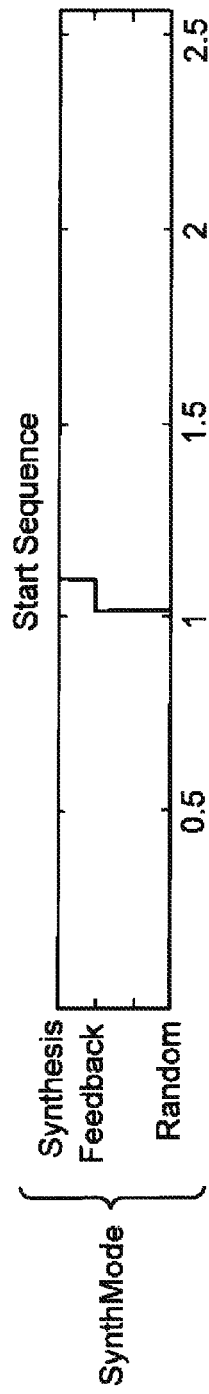
Figure 19E:
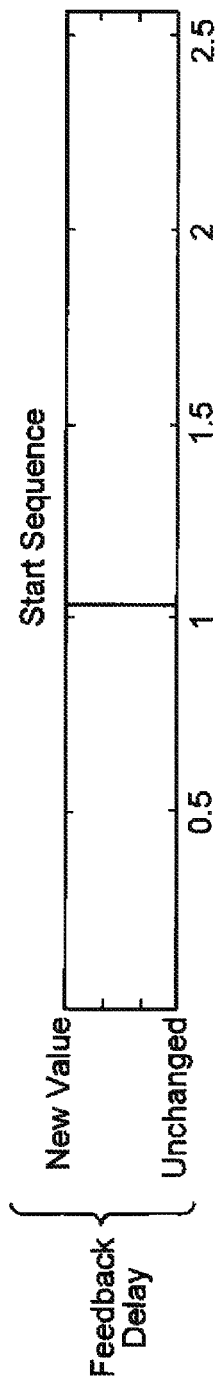

As raw and filtered sensor data is collected (FIGS. 19A and 19B), a drive gain of 10 is applied at approximately 1.1 seconds (FIG. 19C), whereupon the mode switches from the random sequence mode 1604 to the positive feedback mode 1608 (through the zero output mode 1606, as described above). In the positive feedback mode, as can be seen from approximately 1.02 to 1.04 seconds in FIG. 20F, an amplitude of the drive signal initially degrades. This loss of amplitude occurs despite the fact that the sensor signals (at least approximately) represent an acceptable (resonance) frequency for the flowtube 215, because phase of the sensor signals (e.g., FIGS. 19A and 20A) and the phase of the drive signals (e.g., FIGS. 19F and 20F) do not match. When the estimated feedback delay term is applied as shown in FIGS. 19E and 20E (and as explained above with respect to FIG. 18), then the phases match more closely, and the amplitude of the drive signal begins to grow.

Figure 19F:
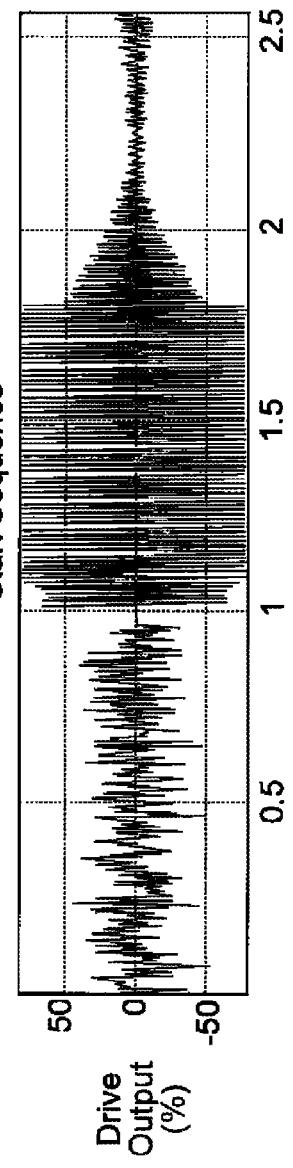
Figure 20A:
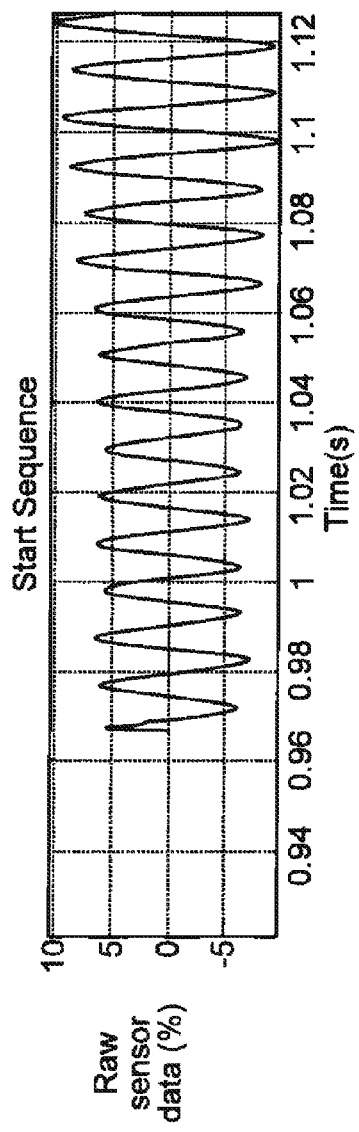
FIGS. 20A-20F illustrate the start sequence of FIGS. 19A-19F in more detail.
Figure 20B:
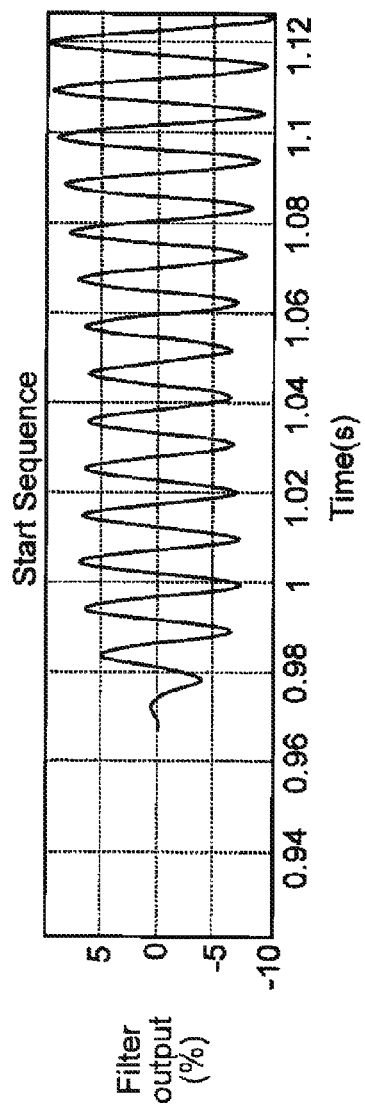
Figure 20C:
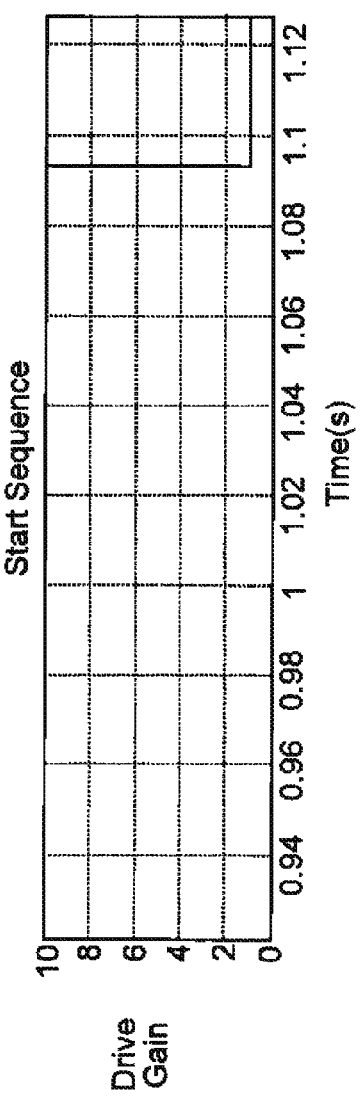
Figure 20D:
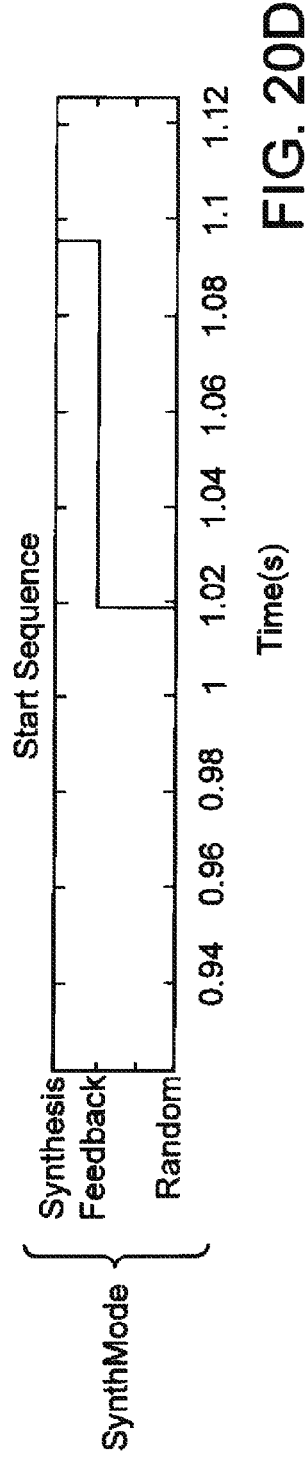
Figure 20E:
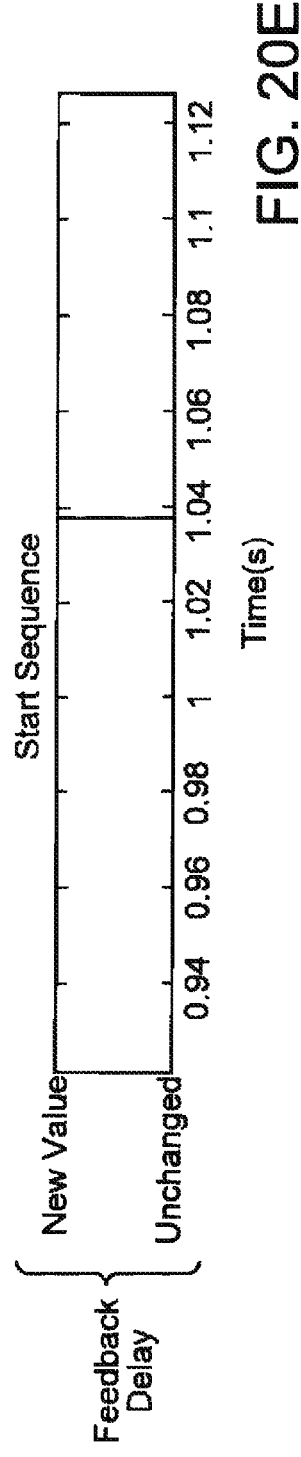
Figure 20F:
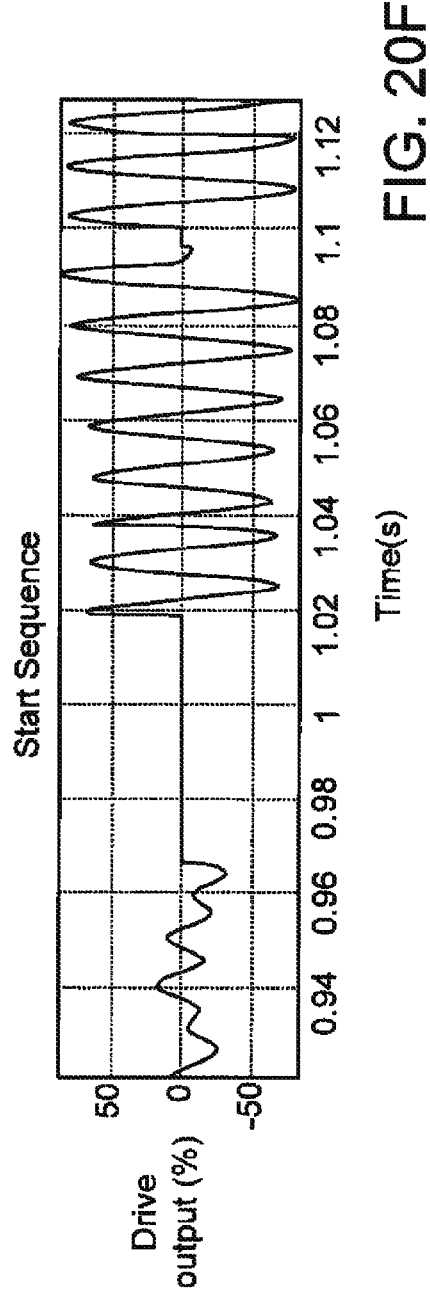

Once the amplitude reaches the threshold for switching to waveform synthesis, the processes described with respect to FIGS. 8-11 are implemented, in which the frequency, filter delay, and sine wave parameters are determined, whereupon the FPGA 315 waits for the relevant zero-crossing of the sensor signal, which happens to occur at approximately 1.1 seconds in FIGS. 19A and 20A, during which time the drive output is momentarily suspended (see FIGS. 19F and 20F). At the appropriate zero-crossing, digital synthesis mode 1610 is implemented, and the amplitude is maintained at a stable value.

It should be understood that, during the digital synthesis mode 1610, the drive gain in FIGS. 19C and 20C might be better understood as an attenuation factor controlled by the amplitude control algorithm mentioned above, assuming that an amplitude of the synthesized sinewave is fixed to a maximum value. Also, at approximately 1.8 seconds, the amplitude control algorithm determines that maximum drive current is no longer necessary, so that reduced current levels are generated after this point to achieve and maintain the sensor voltage at the selected set point.

In implementing the above-described techniques, one body of FPGA code may be used for both the bent and straight flowtubes, but various options (e.g., filter coefficients) may be switched on/off for the different flowtubes. In one implementation, within the FPGA code, the drive output amplitude should not exceed 50% in the case of the straight flowtube 106 (in order to minimize damage thereto). This requirement may not be necessary for the bent flowtube 102. As a consequence of these differences, a separate FPGA bit file may be produced to drive each flowtube type. Nonetheless, the same, for example, VxWorks program may be used for both flowtubes, simply using different configuration file settings.

Thus, it can be seen that these implementations for generating the drive signal, including the actions of generating a random sequence to excite permitted frequencies while awaiting codec warm-up, implementing positive feedback to create a rapid increase in amplitude while suppressing unwanted higher frequencies, and synthesizing a pure waveform for continuous operation providing fast and precise flowtube control and measurement precision, allows for the so advantageous use of a digital flowmeter.

As referred to above, a digital implementation of a flowmeter provides several advantages over analog implementations, in which an op amp is typically employed to provide multiplication of the sensor signal by the drive gain. This is due to the fact that op amps are likely to have an upper gain limit that will be reached if the damping level of the flowtube reaches a certain point (e.g., in the presence of two-phase flow). In these situations, stalling of the system is likely, as the amplitude of the flowtube drops below necessary levels and the feedback loop is not capable of sufficiently increasing the drive gain. Moreover, during the start-up period before fluid may be (completely) flowing, an initial estimate of the drive signal must be selected; selection of a gain that is too high may vary the damping level excessively and/or introduce undesirable higher harmonics, while too low a gain will not start the flowtube.

The digital implementations discussed herein may overcome these and other difficulties of conventional systems. For example, there is no practical limit to the drive gain that may be applied, and therefore stalling due to insufficient gain is extremely unlikely. Additionally, the digital signal processing capabilities of digital flowmeters can temporarily apply negative gain (i.e., intentionally introducing a 180 degree phase offset) for the purpose of aggressive flowtube vibration control.

In implementing these and other features, the digital transmitter 104 initiates and maintains a flowtube oscillation, such that the drive signals generated by the digital transmitter are compensated for phase delays caused by analog and/or digital elements within, or associated with, the digital transmitter. In this way, the drive signals have a desired phase relationship with the oscillation of the particular flowtube being used with the sensor signals detected at the flowtube). As shown in the examples above, such control of drive signal generation, including phase compensation, may be implemented in a variety of ways, for a number of uses in different settings.

Moreover, having described the above techniques as examples of synthesizing pure sinewaves having desired phase characteristics, it should be understood that various other signal modifications also might be implemented, resulting in thriller control and flexibility in operating a digital flowmeter.

For example, once the sinewave synthesis parameters have been determined as described above, the processor 315 and/or the FPGA 310 might include a DC component in the drive signal(s) when actually synthesizing the sine wave. Such a DC component might be useful in, for example, compensating for any observed or calculated offset in the drive signal(s), such as might be caused by component drift.

As another example, a selected amount of hysteresis may be added to the drive signal(s). Such hysteresis may be useful in, for example, compensating for magnetic core hysteresis that may be associated with magnetic coils used for, for example, velocity sensors.

As yet another example, it should be understood that a plurality of sinewaves might be generated, each with their own frequency, phase and amplitude characteristics. These signals might be used to regulate an amplitude of oscillation at the desired resonant mode, while simultaneously suppressing undesirable resonant modes (e.g., by applying negative gain to suppress unwanted Coriolis modes). The plurality of sinewaves also could be used to operate the flowtube in multiple modes at once.

Further, the implementations described above may simplify a structure and operation of a flowmeter in ways not explicitly described above. For example, velocity sensors such as magnetic coils, which often may add size, weight, and/or hysteresis (where the latter factor may result in higher harmonic content in the sensor signals), may be entirely removed during digital synthesis and/or positive feedback modes, and replaced with, for example, accelerometers. Such accelerometers (or other types of position sensors) may have lower size/weight and better hysteresis characteristics than magnetic coil velocity sensors.

Although digital synthesis has primarily been discussed in terms of sinewaves, it also is possible for some implementations to synthesize other waveforms, such as square waves or triangular waves. Such alternative waveforms may be useful in various operational settings, and may be an addition or an alternative to the use of sinewave generation.

A number of implementations have been described. Nevertheless, it will be understood that various modifications may be made. For example, the digital flowmeter may be implemented to handle two-phase flow conditions (e.g., water and gas), and/or three-phase flow conditions (e.g., water, gas, and oil), and may be implemented in various flowtube types other than those disclosed herein. Accordingly, other implementations are within the scope of the following claims.

What is claimed is:

1. A flowmeter comprising:
   a vibratable flowtube;
   a driver connected to the flowtube and configured to impart motion to the flowtube;
   a sensor connected to the flowtube and configured to sense the motion of the flowtube and generate a sensor signal; and
   a controller to receive the sensor signal and configured to:
   receive a first signal at the flowmeter, the first signal representing the motion of the flowtube;
   generate a second signal based on the first signal, the second signal being compensated for a phase delay associated with an electronic element of the flowmeter,
   the second signal having a predetermined amplitude when an amplitude of the first signal is less than a predetermined threshold; and
   apply the second signal to the driver coupled to the flowtube and configured to impart motion to the flowtube.

2. The flowmeter of claim 1, wherein the generated second signal is substantially in phase with the first signal.

3. The flowmeter of claim 1, wherein the controller is further configured to multiply the generated second signal by a gain term prior to applying the second signal to the driver.

* * * * *